(12) United States Patent
Kim et al.

(10) Patent No.: US 12,431,057 B2
(45) Date of Patent: Sep. 30, 2025

(54) METHOD FOR PROVIDING IMAGE AND ELECTRONIC DEVICE FOR SUPPORTING THE SAME

(71) Applicant: SAMSUNG ELECTRONICS CO., LTD., Suwon-si (KR)

(72) Inventors: Jeehong Kim, Suwon-si (KR); Hyuntaek Lee, Suwon-si (KR); Jaehun Cho, Suwon-si (KR); Hojin Kim, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 170 days.

(21) Appl. No.: 18/098,662

(22) Filed: Jan. 18, 2023

(65) Prior Publication Data

US 2023/0230524 A1    Jul. 20, 2023

Related U.S. Application Data

(63) Continuation of application No. PCT/KR2023/000076, filed on Jan. 3, 2023.

(30) Foreign Application Priority Data

Jan. 14, 2022 (KR) .................. 10-2022-0006153
Jan. 27, 2022 (KR) .................. 10-2022-0012526

(51) Int. Cl.
  *G09G 3/20* (2006.01)

(52) U.S. Cl.
  CPC ... *G09G 3/2092* (2013.01); *G09G 2320/0233* (2013.01); *G09G 2320/0626* (2013.01); *G09G 2340/04* (2013.01)

(58) Field of Classification Search
  CPC ......... G09G 3/2092; G09G 2320/0233; G09G 2320/0626; G09G 2340/04;
  (Continued)

(56) References Cited

U.S. PATENT DOCUMENTS 6,262,817 B1 * 7/2001 Sato ..................... H04N 1/6011
                                                   358/518
7,486,299 B2 * 2/2009 Debevec ................. G06T 5/92
                                                   345/589
(Continued)

FOREIGN PATENT DOCUMENTS

JP    2013101344 A    5/2013
JP    2019186690 A    10/2019
(Continued)

OTHER PUBLICATIONS

International Search Report and Written Opinion for International Application No. PCT/KR2023/000076; International Filing Date Jan. 3, 2023; Date of Mailing Mar. 30, 2023; 8 Pages.

(Continued)

*Primary Examiner* — Motilewa Good-Johnson
(74) *Attorney, Agent, or Firm* — CANTOR COLBURN LLP

(57) ABSTRACT

An electronic device according to various embodiments may include a display module, and at least one processor operably connected to the display module, wherein the at least one processor may be configured to obtain an HDR image, determine a size of a first region of the display module, the first region being a region where the HDR image is to be displayed, determine a size of a second region of the display module, the size of the second region corresponding to a maximum size of the HDR image which is capable of being displayed while maintaining an aspect ratio of the HDR image, and set a brightness range of the display module, based on the size of the first region and the size of the second region. Various other embodiments may be provided.

20 Claims, 17 Drawing Sheets

(58) Field of Classification Search
CPC ... G09G 2320/0686; G09G 2340/0407; G09G 2340/0442; G09G 2340/14; G09G 5/10; G09G 2340/045; H04N 7/01; H04N 21/462; H04N 21/485
See application file for complete search history.

(56) References Cited

U.S. PATENT DOCUMENTS

| | | | | |
|---|---|---|---|---|
| 7,978,202 | B2* | 7/2011 | Debevec | G06T 5/90 |
| | | | | 345/589 |
| 9,344,696 | B2* | 5/2016 | Kempf | G09G 5/02 |
| 9,454,799 | B2* | 9/2016 | Baek | H04N 21/42222 |
| 10,403,233 | B2* | 9/2019 | Saito | G09G 5/10 |
| 10,798,347 | B2* | 10/2020 | Hisano | G03B 21/26 |
| 10,832,389 | B2* | 11/2020 | Zhou | G09G 5/377 |
| 11,335,298 | B2* | 5/2022 | Kitsunai | G09G 5/005 |
| 11,594,198 | B2* | 2/2023 | Kajita | G09G 5/10 |
| 2005/0097476 | A1* | 5/2005 | Arora | H04N 7/0122 |
| | | | | 348/E5.111 |
| 2005/0104900 | A1* | 5/2005 | Toyama | G06T 5/90 |
| | | | | 345/605 |
| 2005/0262445 | A1* | 11/2005 | Kizaki | H04N 7/0122 |
| | | | | 348/E5.111 |
| 2009/0034867 | A1 | 2/2009 | Rempel et al. | |
| 2012/0099081 | A1* | 4/2012 | Huang | G03B 21/005 |
| | | | | 353/30 |
| 2012/0268495 | A1* | 10/2012 | Lee | G06F 3/147 |
| | | | | 345/660 |
| 2014/0055510 | A1* | 2/2014 | Kitada | G09G 3/3426 |
| | | | | 345/694 |
| 2015/0077511 | A1* | 3/2015 | Mihara | H04N 7/147 |
| | | | | 348/14.12 |
| 2015/0358646 | A1* | 12/2015 | Mertens | H04N 19/186 |
| | | | | 382/166 |
| 2016/0134832 | A1 | 5/2016 | Yamamoto et al. | |
| 2016/0196806 | A1* | 7/2016 | Lee | G09G 5/14 |
| | | | | 345/661 |
| 2016/0300537 | A1 | 10/2016 | Hoffman et al. | |
| 2016/0306533 | A1* | 10/2016 | Agarwal | G06F 3/04845 |
| 2017/0221450 | A1* | 8/2017 | Kim | G06F 1/1637 |
| 2017/0330312 | A1* | 11/2017 | Nam | G06T 5/92 |
| 2018/0204542 | A1 | 7/2018 | Saito | |
| 2019/0027077 | A1* | 1/2019 | Kudo | G09G 3/2018 |
| 2019/0088193 | A1* | 3/2019 | Tada | G06F 3/04845 |
| 2019/0164521 | A1* | 5/2019 | Feng | G09G 3/3208 |
| 2019/0295504 | A1 | 9/2019 | Kiong et al. | |
| 2019/0335146 | A1* | 10/2019 | Hisano | G06T 5/92 |
| 2020/0058109 | A1* | 2/2020 | Rhyu | G09G 3/3426 |
| 2020/0193572 | A1 | 6/2020 | Zhou et al. | |
| 2020/0252687 | A1* | 8/2020 | Ryu | H04N 9/642 |
| 2020/0302659 | A1 | 9/2020 | Urabe et al. | |
| 2020/0333666 | A1* | 10/2020 | Hohjoh | G02F 1/133611 |
| 2021/0248956 | A1 | 8/2021 | Pyo et al. | |
| 2021/0335323 | A1* | 10/2021 | Kajita | G09G 5/10 |
| 2021/0364447 | A1* | 11/2021 | Naruse | G06T 7/001 |
| 2021/0366375 | A1 | 11/2021 | Chun et al. | |
| 2022/0036819 | A1* | 2/2022 | Kang | G09G 3/3208 |
| 2022/0121244 | A1 | 4/2022 | Kwon | |
| 2023/0171509 | A1* | 6/2023 | Varghese | G06T 5/50 |
| | | | | 348/222.1 |
| 2023/0230524 | A1* | 7/2023 | Kim | H04N 7/01 |
| | | | | 345/589 |
| 2024/0135900 | A1* | 4/2024 | Zhang | H04N 23/71 |

FOREIGN PATENT DOCUMENTS

| | | |
|---|---|---|
| KR | 20160022305 A | 2/2016 |
| KR | 20160097023 A | 8/2016 |
| KR | 1020160121782 | 10/2016 |
| KR | 20180136303 A | 12/2018 |
| KR | 1020190001466 | 1/2019 |
| KR | 20200081174 A | 7/2020 |
| KR | 20210031515 A | 3/2021 |
| KR | 102256681 B1 | 5/2021 |

OTHER PUBLICATIONS

Extended European Search Report Issued In EP Application No. 23740378.7-1207; Mail Date Dec. 4, 2024; 11 Pages.

* cited by examiner

601

602

603

604

METHOD FOR PROVIDING IMAGE AND ELECTRONIC DEVICE FOR SUPPORTING THE SAME

CROSS-REFERENCE TO RELATED APPLICATION(S)

This application is a continuation application, claiming priority under § 365(c), of International Application No. PCT/KR2023/000076, filed on Jan. 3, 2023, which is based on and claims the benefit of Korean patent application number 10-2022-0012526, filed on Jan. 27, 2022 in the Korean Intellectual Property Office and of Korean patent application number 10-2022-0006153, filed on Jan. 14, 2022 in the Korean Intellectual Property Office, the disclosures of which are incorporated by reference herein in their entireties.

TECHNICAL FIELD

Various embodiments of the disclosure relate to a method of providing an image and an electronic device supporting the same.

BACKGROUND ART

Electronic devices for producing an image to which a high dynamic range (HDR) is applied (hereinafter referred to as an "HDR image") and displaying the produced HDR image are being developed. HDR is a technology for displaying an image similar to that of an object recognized by a user with their eyes by more finely dividing the contrast.

The HDR image may have brightness up to about 10000 Nits, and the brightness of the HDR image may be mapped from a mastering display to a target display through tone mapping.

In the case of displaying an HDR image on the target display, the quality of the HDR image may deteriorate. For example, in the case where the maximum brightness of a mastering display is 4000 Nit and where the brightness of a target display having the maximum brightness of 1000 Nits is set to 500 Nits by a user, an HDR image capable of being capable of being displayed at brightness of 4000 Nits on the mastering display may be displayed at 500 Nits or less on the target display. In this case, quality of the HDR image may deteriorate.

The target display may reduce quality deterioration of the HDR image by upwardly adjusting (e.g., increasing) the brightness of the target display configured by the user for an image including the HDR image.

DETAILED DESCRIPTION OF THE INVENTION

Technical Problem

In order to display an HDR image, an electronic device (e.g., a target display) may increase the brightness of a display included in the electronic device if a specified condition is satisfied. For example, Except for the case of displaying an HDR image using a multi-window of displaying a screen through a plurality of windows or a pop-up window of popping up one or more windows, the electronic device may increase the brightness of a display configured by the user if a condition for displaying an HDR image through the display (hereinafter referred to as a "first condition") is satisfied. As another example, if a condition (hereinafter referred to as a "second condition") in which the ratio of the region where the HDR image is to be displayed in a display to the size of the entire display region is equal to or greater than a specified ratio (e.g., about 50%) is satisfied, the electronic device may increase the brightness of the display configured by the user.

In the case where the electronic device increases the brightness of the display as the first condition is satisfied, if the brightness of the display is increased irrespective of the size of the region where the HDR image is displayed on the display, non-HDR images (e.g., standard dynamic range (SDR) images), which are to be displayed with the HDR image, may be displayed excessively bright.

In addition, in the case where the electronic device increases the brightness of the display as the second condition is satisfied, for example, in the case where an HDR image is displayed at a maximum size on the display while maintaining the aspect ratio of the HDR image (e.g., when an HDR image is displayed in the full screen while maintaining the aspect ratio of the HDR image), the ratio of the region where the HDR image is to be displayed on the display to size of the entire display region may vary depending on the aspect ratio of the HDR image and/or the aspect ratio of the display. In this case, even if the size of the region in which the HDR image is displayed on the display is maintained, the operation of increasing the brightness of the display may or may not be performed depending on the aspect ratio of the HDR image and/or the aspect ratio of the display. In addition, if the ratio of the region where an HDR image is to be displayed on the display to the size of the entire display region changes from a ratio (e.g., about 49%), which is less than a specified ratio (e.g., about 50%) configured as one value, to a ratio (e.g., about 51%) greater than the same, the electronic device may increase the brightness of the display so that the brightness of the display may abruptly change.

According to various embodiments of the disclosure, if an image to be displayed through a display includes an HDR image and a non-HDR image, it is possible to reduce degradation of quality of the HDR image and/or prevent the non-HDR image from being displayed excessively bright.

The technical problems to be solved by the disclosure are not limited to the technical problems mentioned above, and other technical problems that are not mentioned may be clearly understood by those of ordinary skill in the art related to this document from the description below.

Technical Solution

An electronic device according to various embodiments may include a display module, and at least one processor operatively connected to the display module, wherein the at least one processor may be configured to obtain an HDR image, determine a size of a first region of the display module, the first region being a region where the HDR image is to be displayed, determine a size of a second region of the display module, the size of the second region corresponding to a maximum size of the HDR image which is capable of being displayed while maintaining an aspect ratio of the HDR image, and set a brightness range of the display module, based on the size of the first region and the size of the second region.

A method of providing an image in an electronic device according to various embodiments may include obtaining an HDR image, determining a size of a first region of a display module of the electronic device, the first region being a region where the HDR image is to be displayed, determining a size of a second region of the display module, the size of the second region corresponding to a maximum size of the HDR image which is capable of being displayed while maintaining an aspect ratio of the HDR image, and setting a brightness range of the display module, based on the size of the first region and the size of the second region.

Advantageous Effects

A method of providing an image according to various embodiments and an electronic device supporting the same, when an image to be displayed through a display includes an HDR image and a non-HDR image, may gradually increase the brightness of a display configured by a user, thereby reducing degradation of quality of the HDR image and/or preventing the non-HDR image from being displayed excessively bright.

MODE FOR CARRYING OUT THE INVENTION

Figure 1:
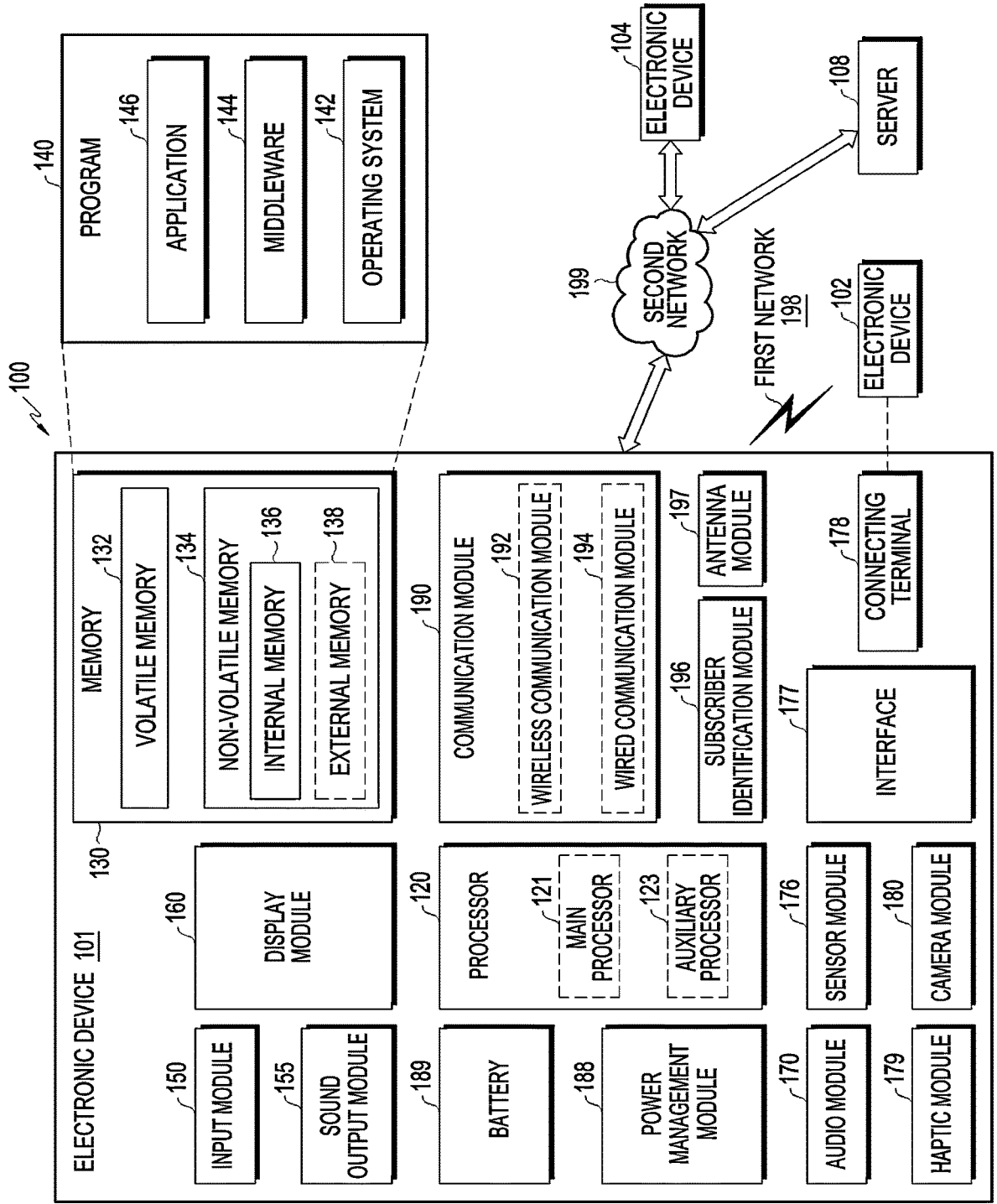
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
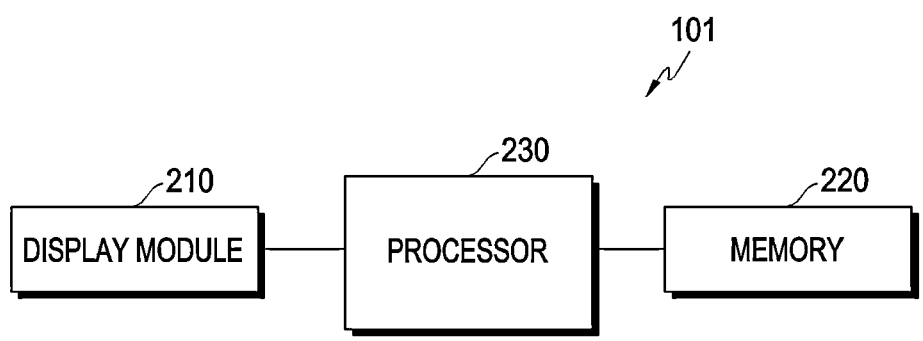
FIG. 2 is a block diagram of an electronic device according to various embodiments.

FIG. 2 is a block diagram of an electronic device 101 according to various embodiments.

Referring to FIG. 2, in an embodiment, the electronic device 101 may include a display module 210, a memory 220, and/or a processor 230.

In an embodiment, the display module 210 may be included in the display module 160 in FIG. 1.

In an embodiment, the display module 210 may display an image including an HDR image. For example, the display module 210 may display an image including one or more HDR images and non-HDR images (e.g., SDR images). However, the disclosure is not limited thereto, and the display module 210 may display only one or more HDR images or display only non-HDR images.

In an embodiment, the display module 210 may display an image including an HDR image using a multi-window function of displaying a screen through a plurality of windows or a pop-up window function of displaying a screen in a manner of popping up one or more windows.

In an embodiment, the display module 210 may include a flexible display in which the region visually exposed to the outside may vary. Examples in which an electronic device including a flexible display performs an operation of providing an image will be described in detail later with reference to FIG. 11A.

In an embodiment, the memory 220 may be included in the memory 130 in FIG. 1.

In an embodiment, the memory 220 may store information for performing at least part of an operation of providing an image. For example, the memory 220 may include instructions that cause the processor 230 to perform an operation of providing an image.

In an embodiment, the processor 230 may be included in the processor 120 in FIG. 1.

In an embodiment, the processor 230 may control overall operation of providing an image. In an embodiment, the processor 230 may include one or more processors for performing an operation of providing an image.

In an embodiment, although it is illustrated in FIG. 2 that the electronic device 101 includes the display module 210, the memory 220, and/or the processor 230, the disclosure is not limited thereto. For example, the electronic device 101 may further include at least one element (e.g., the camera module 180 or the communication module 190) illustrated in FIG. 1, in addition to the elements illustrated in FIG. 2.

The electronic device 101 according to various embodiments may include a display module 210 and at least one processor (e.g., the processor 230) operatively connected to the display module 210, and the at least one processor (e.g., the processor 230) may be configured to obtain an HDR image, determine a size of a first region where the HDR image is to be displayed in the display module 210, determine a size of a second region where the HDR image is able to be displayed in the maximum size while maintaining an aspect ratio of the HDR image in the display module 210, and configure a brightness range of the display module 210, based on the size of the first region and the size of the second region.

In various embodiments, the aspect ratio of the HDR image may be a ratio of a vertical value of a resolution of the HDR image to a horizontal value of the resolution of the HDR image, and the second region may be a region having a maximum size among regions capable of displaying the HDR image while maintaining the aspect ratio of the HDR image in the display module 210.

In various embodiments, the at least one processor (e.g., the processor 230) may be configured to determine a region ratio that is a ratio of the size of the first region to the size of the second region, determine a scale factor, based on the region ratio, and set the brightness range of the display module 210, based on the scale factor.

In various embodiments, the scale factor may increase as the region ratio increases in a specified section of the region ratio.

In various embodiments, the at least one processor (e.g., the processor 230) may be configured to set, if the region ratio is less than a minimum value of the specified section, the brightness range of the display module 210 based on a first brightness of the display module 210 set by a user. In one embodiment, the at least one processor (e.g., the processor 230) may be configured to set, if the region ratio is greater than or equal to the minimum value of the specified section and less than a maximum value of the specified section, the brightness range of the display module 210 based on the scale factor, which increases as the region ratio increases in the specified section, and the first brightness. In one embodiment, the at least one processor (e.g., the processor 230) may be configured to set, if the region ratio is greater than or equal to the maximum value of the specified section, the brightness range of the display module 210 based on the scale factor determined as a ratio of the maximum brightness of the display module 210 set to display the HDR image to the maximum brightness of the display module 210 capable of being set by the user and the first brightness.

In various embodiments, the at least one processor (e.g., the processor 230) may be, based on the HDR image including a plurality of HDR images, configured to determine the sizes of a plurality of first regions where the plurality of HDR images is to be displayed in the display module 210, determine the sizes of a plurality of second regions where the HDR image is able to be displayed in the maximum size while maintaining the aspect ratio of the HDR image in the display module 210, determine a plurality of region ratios, based on the sizes of the plurality of first regions and the sizes of the plurality of second regions, and determine the region ratio, based on the plurality of region ratios and a plurality of weights assigned to the respective region ratios.

In various embodiments, the at least one processor (e.g., the processor 230) may be, based on a plurality of HDR images included in the HDR image being respectively displayed in a plurality of windows produced by a multi-window function, configured to determine sizes of a plurality of first regions where the plurality of HDR images is to be displayed in the plurality of windows, determine sizes of a plurality of second regions where the HDR image is able to be displayed in the maximum size while maintaining the aspect ratio of the HDR image in the plurality of windows, and set the brightness range of the display module 210, based on the sizes of the plurality of first regions and the sizes of the plurality of second regions.

In various embodiments, the at least one processor (e.g., the processor 230) may be, based on one or more HDR images included in the HDR image being produced by a pop-up window function and respectively displayed in one or more windows that at least partially overlap each other, configured to identify a window disposed at the top of the display module 210 among the one or more windows, and determine an HDR image displayed in the window as the HDR image for determining the first region and the second region.

Figure 3:
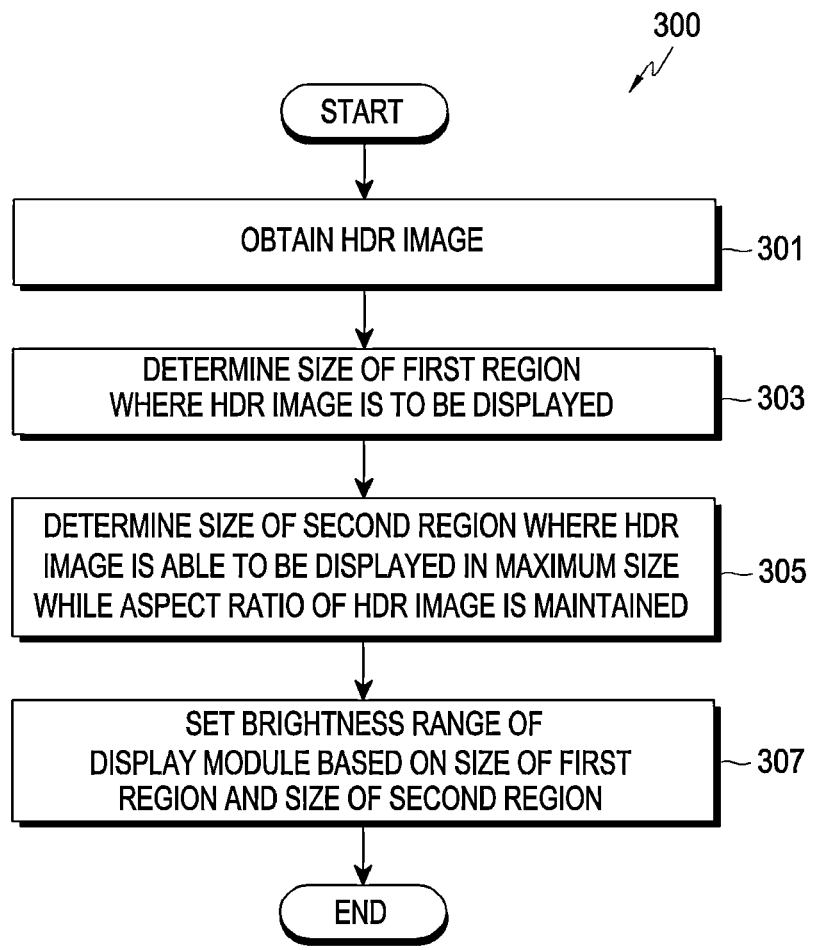
FIG. 3 is a flowchart illustrating a method of providing an image according to various embodiments.

FIG. 3 is a flowchart 300 illustrating a method of providing an image according to various embodiments.

Referring to FIG. 3, in operation 301, in an embodiment, the processor 230 may obtain (or receive) an HDR image.

In an embodiment, the processor 230 may receive an HDR image signal including an encoded HDR image and metadata (e.g., metadata of an HDR image) from an external electronic device (e.g., the server 108, the electronic device 102, and/or the electronic device 104). The HDR image signal may be obtained (or received) from the external electronic device by a real-time streaming method or a download method. The processor 230 may decode the encoded HDR image (e.g., decode the HDR image using a decoding method corresponding to an encoding method thereof) to obtain the HDR image, and parse the HDR image signal to obtain metadata.

In an embodiment, the processor 230 may obtain an HDR image (and/or metadata) through the camera module 180. In an embodiment, the processor 230 may obtain an HDR image from the memory 220.

In an embodiment, the metadata may include dynamic metadata. In an embodiment, the metadata may include at least one of a color gamut, a color depth (or a bit depth), a gamma value, or data for tone mapping. The data for tone mapping may include a tone mapping coefficient. The tone mapping coefficient may include data necessary for obtaining a tone mapping function in the electronic device 101. For example, the tone mapping coefficient may include a maximum luminance of a mastering display, a maximum luminance of a target display, or coordinates (e.g., at least one of knee point coordinates or anchor point coordinates) of at least one point necessary to obtain (e.g., produce) a tone mapping function. However, the information included in the metadata is not limited to the above-described examples. For example, the metadata may further include information specified in standards related to HDR (e.g., CTA-861, ST 2086, or ST 2094-40).

In an embodiment, the processor 230 may obtain an HDR image and a non-HDR image to be displayed together with the HDR image through the display module 210. The non-HDR image may include an image (e.g., an SDR image), excluding the HDR image.

In an embodiment, the HDR image may include a static image and/or a dynamic image (video) capable of being displayed in HDR.

In operation 303, in an embodiment, the processor 230 may determine the size of a first region where the HDR image is to be displayed in the display module 210.

In an embodiment, the processor 230 may determine the size of a region (hereinafter, referred to as a "first region") where the HDR image is displayed in the display module 210, based on resolution of the HDR image, the size of the display module 210, and/or setting of an application (e.g., a video application or a gallery application) for displaying the HDR image.

In an embodiment, the resolution of the HDR image may include the number of horizontal pixels and the number of vertical pixels constituting the HDR image.

In an embodiment, the size of the display module 210 may include the total number of pixels (or the area occupied by all pixels) included in the display module 210.

In an embodiment, the setting of the application for displaying the HDR image may include setting related to the position and/or size of the first region (or window) where the HDR image is to be displayed in a screen that is to be displayed through the display module 210.

In an embodiment, the size of the first region may include the number of pixels (or the area occupied by the pixels) disposed in the first region in the display module 210.

In an embodiment, the HDR image to be displayed through the display module 210 may be an original HDR image produced during mastering. However, the disclosure is not limited thereto, and the HDR image to be displayed through the display module 210 may include an image obtained by cropping the original HDR image and/or an image obtain by enlarging/reducing the original HDR image, based on a zoom magnification. For example, the HDR image to be displayed through the display module 210 may include an image obtained by editing (or modifying) the original HDR image and then displayed through the display module 210.

In operation 305, in an embodiment, the processor 230 may determine the size of a second region where the HDR image is able to be displayed in the maximum size while the aspect ratio of the HDR image is maintained in the display module 210.

In an embodiment, the aspect ratio of the HDR image may indicate a ratio of a vertical value to a horizontal value of the resolution of the HDR image. For example, if the resolution of the HDR image is (1920*1080) (the horizontal value of the resolution of the HDR image is 1920 and the vertical value of the resolution of the HDR image is 1080), the aspect ratio of the HDR image may be 1080/1920.

In an embodiment, the second region where the HDR image is able to be displayed in the maximum size while maintaining the aspect ratio of the HDR image in the display module 210 (hereinafter, referred to as a "second region") may be a region having the largest size among regions capable of displaying the HDR image while maintaining the aspect ratio of the HDR image in the display module 210.

In an embodiment, the size of the second region may include the number of pixels (or the area occupied by the pixels) disposed in the second region in the display module 210.

Hereinafter, a method of determining the size of the second region will be described in more detail with reference to FIG. 4.

Figure 4:
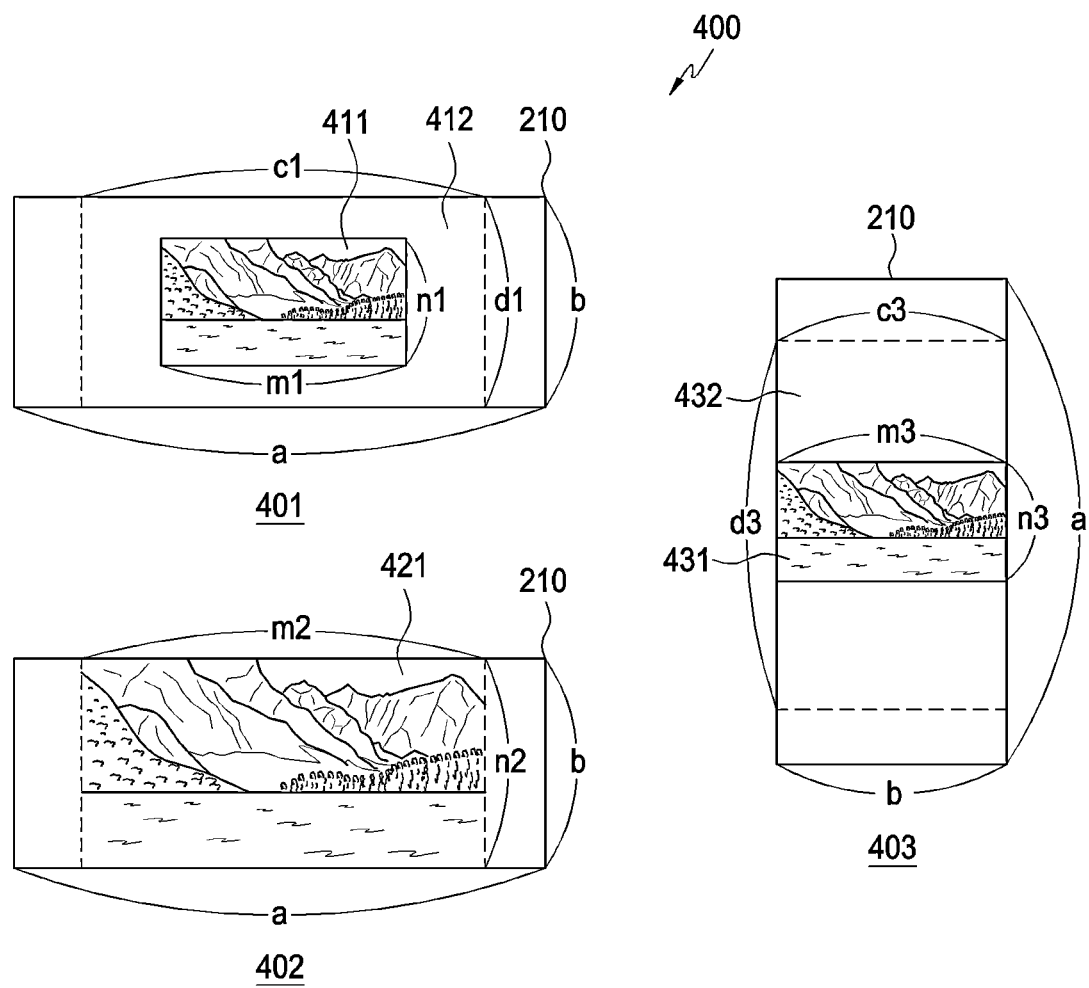
FIG. 4 is an exemplary diagram illustrating a method of determining a size of a second region according to various embodiments.

FIG. 4 is an exemplary diagram 400 illustrating a method of determining the size of a second region according to various embodiments.

Referring to FIG. 4, in an embodiment, the processor 230 may determine (e.g., calculate) the size of the second region, based on horizontal and vertical lengths of the first region (or horizontal and vertical values of the resolution of the HDR image), and horizontal and vertical lengths of the display module 210. For example, the processor 230 may determine the size of the second region, based on Equation 1 to Equation 4 below.

$$\text{First ratio} = \frac{\text{Max}(W_{display}, H_{display})}{\text{Min}(W_{display}, H_{display})} \quad [\text{Equation 1}]$$

In Equation 1, $W_{display}$ may represent the horizontal length of the display module 210, $H_{display}$ may represent the vertical length of the display module 210, Max($W_{display}$, $H_{display}$) may represent the longer one of the horizontal length of the display module 210 and the vertical length of the display module 210, and Min($W_{display}$, $H_{display}$) may represent the shorter one of the horizontal length of the display module 210 and the vertical length of the display module 210.

$$\text{Second ratio} = \frac{\text{Max}(W_{video}, H_{video})}{\text{Min}(W_{video}, H_{video})} \quad [\text{Equation 2}]$$

In Equation 2, $W_{video}$ may represent the horizontal length of the first region (or the horizontal value of the resolution of the HDR image), $H_{video}$ may represent the vertical length of the first region (or the vertical value of the resolution of the HDR image), Max($W_{video}$, $H_{video}$) may represent the longer one of the horizontal length of the first region and the vertical length of the display module 210, and Min($W_{video}$, $H_{video}$) may represent the shorter one of the horizontal length of the first region and the vertical length of the display module 210.

If first ratio is greater than or equal to second ratio,
size of second region=Min($W_{device}$,$H_{device}$)×
{Min($W_{device}$,$H_{device}$)×(second ratio)}     [Equation 3]

If first ratio is less than second ratio, size of second
region=Max($W_{device}$,$H_{device}$)×{Max($W_{device}$,
$H_{device}$)/(second ratio)}     [Equation 4]

Referring to Equation 3 and Equation 4, if the first ratio calculated using Equation 1 is greater than or equal to the second ratio calculated using Equation 2, the processor 230 may calculate the size of the second region using Equation 3. If the first ratio calculated using Equation 1 is less than the second ratio calculated using Equation 2, the processor 230 may calculate the size of the second region using Equation 4.

In an embodiment, in reference numeral 401 in FIG. 4, the horizontal length and vertical length of the display module 210 in a horizontal mode (also referred to as a "landscape mode") may be a and b (a>b), respectively, and the horizontal length and vertical length of a first region 411 where the HDR image is displayed may be m1 and n1 (m1>n1), respectively. The processor 230 may calculate a/b as a first ratio and m1/n1 as a second ratio, based on Equation 1 and Equation 2. Based on identifying that the first ratio is greater than the second ratio in reference numeral 401, the processor 230 may determine the size of a second region 412 to be b*{b*(m1/n1)}, based on Equation 3. In reference numeral 401, the horizontal length c1 of the second region 412 may be b*(m1/n1), and the vertical length d1 of the second region 412 may be b.

In an embodiment, in reference numeral 402 in FIG. 4, the horizontal length and vertical length of the display module 210 in the landscape mode may be a and b (a>b), respectively, and the horizontal length and vertical length of a first region 421 where the HDR image is displayed may be m2 and n2 (m2>n2), respectively. The processor 230 may calculate a/b as a first ratio and m2/n2 as a second ratio, based on Equation 1 and Equation 2. Based on identifying that the first ratio is greater than the second ratio in reference numeral 401, the processor 230 may determine the size of a second region to be b*{b*(m2/n2)}, based on Equation 3. In reference numeral 402, the horizontal length of the second region may be b*(m2/n2), and the vertical length of the second region 412 may be b. Since reference numeral 402 shows the case where the HDR image is displayed with the maximum size in the display module 210 while maintaining the aspect ratio of the HDR image, the size of the first region 421 may be the same as the size of the second region.

In an embodiment, in reference numeral 403 in FIG. 4, the horizontal length and vertical length of the display module 210 in a vertical mode (also referred to as a "portrait mode") may be b and a (a>b), respectively, and the horizontal length and vertical length of a first region 431 where the HDR image is displayed may be m3 and n3 (m3>n3), respectively. The processor 230 may calculate a/b as a first ratio and m3/n3 as a second ratio, based on Equation 1 and Equation 2. Based on identifying that the first ratio is greater than the second ratio in reference numeral 403, the processor 230 may determine the size of a second region 432 to be b*{b*(m3/n3)}, based on Equation 3. In reference numeral 403, the horizontal length c3 of the second region 432 may be b, and the vertical length d3 of the second region 432 may be b*(m3/n3).

Referring back to FIG. 3, in operation 307, in an embodiment, the processor 230 may set a brightness range of the display module 210, based on the size of the first region and the size of the second region.

In an embodiment, the brightness range of the display module 210 may be a range of brightness (also referred to as "luminance") in which the display module 210 displays an HDR image. For example, if the brightness range of the display module 210 is set as 0 Nit to 400 Nits, the HDR image may be displayed in the brightness range of 0 Nit to 400 Nits. As another example, if the brightness range of the display module 210 is set as 0 Nit to 400 Nits and if the grayscale of the HDR image has a value in the range of 0 to 255, a pixel of the HDR image having the maximum grayscale of 255 may be displayed at brightness of 400 Nits through the display module 210. Hereinafter, the maximum value of the brightness range of the display module 210 will be referred to as "brightness of the display module 210" for convenience of description. In addition, the maximum brightness of the display module 210 (e.g., the maximum brightness that the display module 210 is able to provide in hardware) will be referred to as "maximum brightness of the display module 210". In addition, the brightness of the display module 210 set by a user (e.g., set based on user input) (e.g., the maximum value of the brightness range of the display module 210 set by a user) will be referred to as "user-specified brightness".

In an embodiment, the maximum brightness of the display module 210 capable of being set by a user may be less than the maximum brightness of the display module 210. For example, when the electronic device 101 is manufactured, if the maximum brightness of the display module 210 is 500 Nits, the maximum brightness of the display module 210 capable of being set by a user may be set as 400 Nits in consideration of battery power consumption and/or battery lifespan. However, the disclosure is not limited thereto, and the maximum brightness of the display module 210 capable of being set by a user may be the same as the maximum brightness of the display module 210.

Hereinafter, an embodiment of an operation in which the processor 230 sets the brightness range of the display module 210, based on the size of the first region and the size of the second region will be described in detail with reference to FIGS. 5 to 7.

Figure 5:
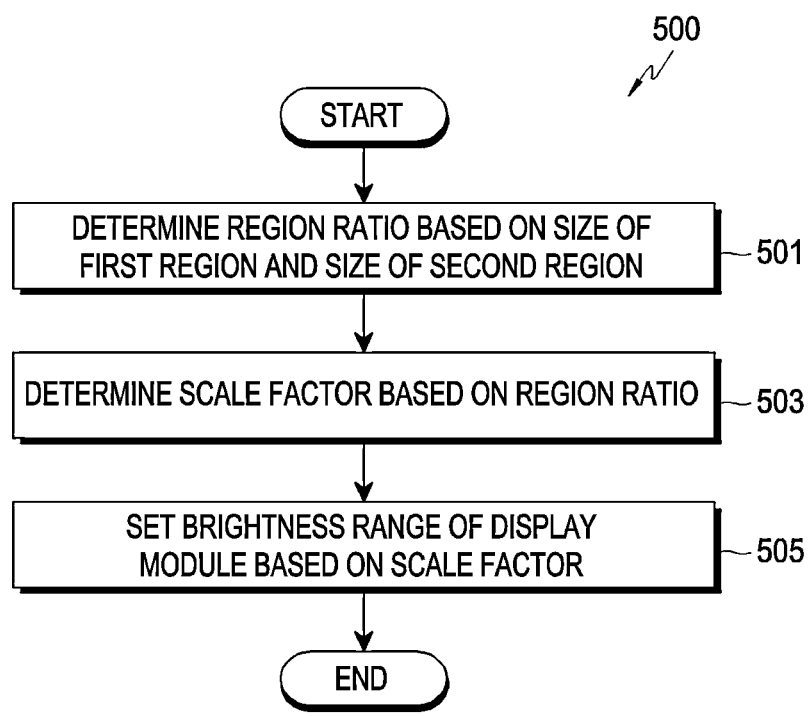
FIG. 5 is a flowchart illustrating a method of setting a brightness range of a display according to various embodiments.

FIG. 5 is a flowchart 500 illustrating a method of setting a brightness range of a display according to various embodiments.

Figure 6:
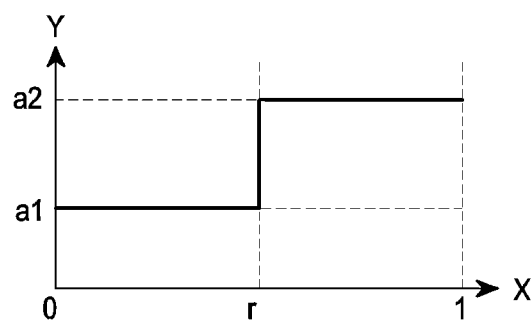
FIG. 6 is an exemplary diagram illustrating a method of setting a brightness range of a display according to various embodiments.
Figure 6:
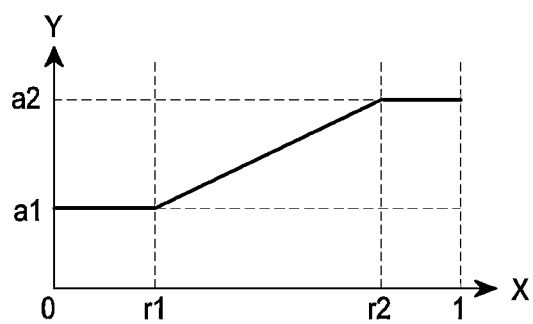
Figure 6:
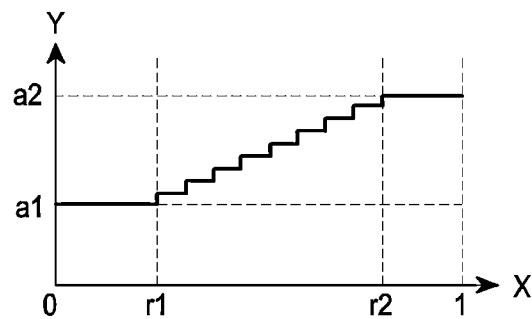
Figure 6:
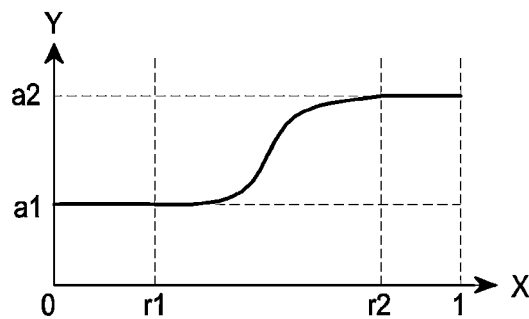

FIG. 6 is an exemplary diagram 600 illustrating a method of setting a brightness range of a display according to various embodiments.

Figure 7:
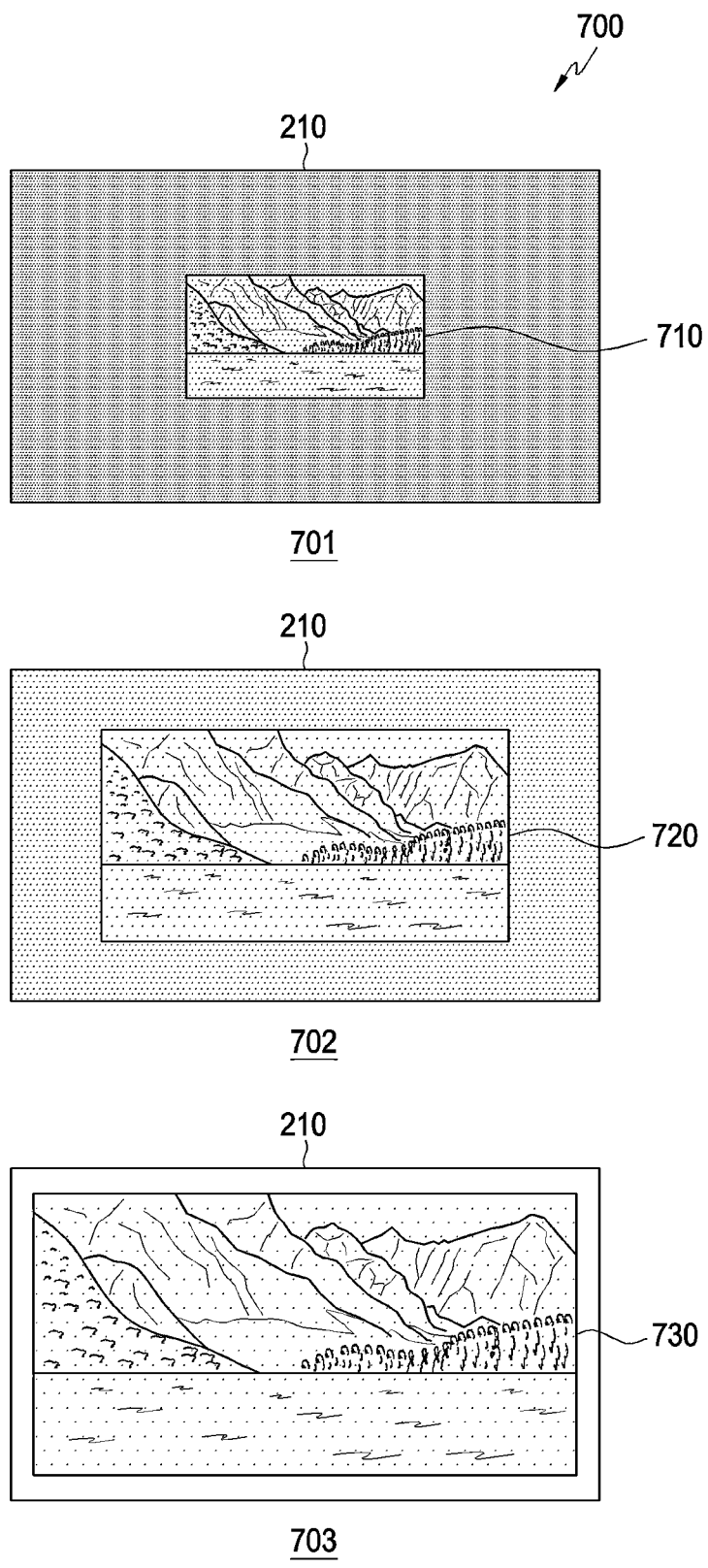
FIG. 7 is an exemplary diagram illustrating a method of setting a brightness range of a display according to various embodiments.

FIG. 7 is an exemplary diagram 700 illustrating a method of setting a brightness range of a display according to various embodiments.

Referring to FIGS. 5 to 7, in operation 501, in an embodiment, the processor 230 may determine a region ratio, based on the size of the first region and the size of the second region.

In an embodiment, the region ratio (hereinafter, referred to as a "region ratio") may be defined as a ratio of the size of the first region to the size of the second region. In an embodiment, the region ratio may be a value for determining a scale factor to be described in operation 503.

In operation 503, in an embodiment, the processor 230 may determine a scale factor, based on the region ratio.

In an embodiment, the scale factor may be a ratio of the brightness of the display module 210 to the user-specified brightness. For example, the processor 230 may determine the brightness of the display module 210 (e.g., the brightness range of the display module 210) by multiplying the scale factor and the user-specified brightness. In an embodiment, the scale factor may be a coefficient for upwardly adjusting (e.g., increasing) the brightness set by a user. In an embodiment, the scale factor may be referred to as a "brightness increase coefficient".

In an embodiment, the processor 230 may set a function of the scale factor for the region ratio such that the scale factor increases as the region ratio increases in a specified section of the region ratio. For example, the processor 230 may determine the scale factor using Equation 5 below.

$$\text{Scale factor} = \begin{cases} 1 & (\text{region ratio} < r1) \\ f(x) & (r1 \le \text{region ratio} < r2) \\ \max & (\text{region ratio} \ge r2) \end{cases} \quad [\text{Equation 5}]$$

Referring to Equation 5, if the region ratio is less than a first threshold region ratio r1 (e.g., about 0.4) as the minimum value of the specified section, the processor 230 may determine the scale factor to be "1". If the scale factor is "1", the processor 230 may determine the user-specified brightness as the brightness of the display module 210.

In an embodiment, if the region ratio is greater than or equal to the first threshold region ratio r1 and is less than a second threshold region ratio r2 (e.g., about 0.9) as the maximum value of the specified section, the processor 230 may determine the scale factor, based on a function f(x). In an embodiment, the function f(x) may be a function that gradually increases the scale factor as the region ratio increases in the range where the region ratio is greater than or equal to the first threshold region ratio r1 and less than the second threshold region ratio r2. For example, as shown in the graph shown by reference numeral 602 in FIG. 6, the function f(x) may be a linear function that increases the scale factor as the region ratio increases in the range where the region ratio is equal to or greater than the first threshold region ratio r1 and less than the second threshold region ratio r2. As another example, as shown in the graph shown by reference numeral 603 in FIG. 6, the function f(x) may be a function that increases the scale factor stepwise as the region ratio increases in the range where the region ratio is greater than or equal to the first threshold region ratio r1 and less than the second threshold region ratio r2. As another example, as shown in the graph shown by reference numeral 604 in FIG. 6, the function f(x) may be a multi-order function that increases the scale factor as the region ratio increases (or a monotone increasing function in which the scale factor does not decrease as the region ratio increases) in the range where the region ratio is greater than or equal to the first threshold region ratio r1 and less than the second threshold region ratio r2. However, the form of the function f(x) is not limited to the graphs shown by reference numerals 602 to 604.

In an embodiment, if the region ratio is greater than or equal to the second threshold region ratio r2, the processor 230 may determine the scale factor to be max. Max may be a ratio of the maximum brightness of the display module 210 set to display an HDR image (e.g., the maximum brightness of the display module 210 set when displaying an HDR image) to the maximum brightness of the display module 210 capable of being set by the user. In an embodiment, the maximum brightness of the display module 210 set display an HDR image may be set to be greater than the maximum brightness of the display module 210 capable of being set by the user and equal to or less than the maximum brightness of the display module 210 (the maximum brightness that the display module 210 is able to provide in hardware).

Although the processor 230 is illustrated to increase the scale factor as the region ratio increases in the specified section of the region ratio in operation 503, the disclosure is not limited thereto. For example, the processor 230 may increase the scale factor as the region ratio increases in the entire section of the region ratio (e.g., when the section of the region ratio is 0 to 1).

In operation 505, in an embodiment, the processor 230 may set a brightness range of the display module 210, based on the scale factor. For example, the processor 230 may determine the brightness of the display module 210 by multiplying the scale factor determined in operation 503 and the user-specified brightness, and set the brightness range of the display module 210, based on the determined brightness of the display module 210.

In an embodiment, the processor 230 may set the function of the scale factor for the region ratio such that the scale factor increases as the region ratio increases in a specified section of the region ratio, thereby, in the case where the image to be displayed through the display includes an HDR image and a non-HDR image, reducing degradation of quality of the HDR image and preventing the non-HDR image from being displayed excessively bright.

In an embodiment, reference numeral 601 in FIG. 6 may represent a graph of the brightness of the display module 210 depending on the region ratio according to a comparative example. In the comparative example, if the ratio of the region where the HDR image is displayed in the display module 210 to the size of the entire region of the display module 210 is less than a specified ratio r (e.g., about 0.5), the brightness of the display module 210 may be set to be the user-specified brightness (e.g., a1). In the comparative example, if the ratio of the region where the HDR image is displayed in the display module 210 to the size of the entire region of the display module 210 is greater than or equal to a specified ratio r, it may be set to be the brightness (e.g., a2) obtained by multiplying the ratio of the maximum brightness of the display module 210 set to display the HDR image to the maximum brightness of the display module 210 capable of being set by the user of the display module 210 and the user-specified brightness. In the comparative example, in the case where the ratio of the region where the HDR image is to be displayed on the display to the size of the entire region of the display changes from a ratio (e.g., about 0.49) less than a specified ratio r (e.g., about 0.5) to a ratio (e.g., about 0.51) greater than the same, the brightness of the display module 210 may be changed abruptly.

In an embodiment, reference numeral 602 may show a graph representing the brightness of the display module 210 depending on the region ratio in the case where the function f(x) in Equation 5 is a linear function that increases the scale factor as the region ratio increases in the range where the region ratio is greater than or equal to the first threshold region ratio r1 and less than the second threshold region ratio r2. In reference numeral 602, if the region ratio is less than the first threshold region ratio r1, the processor 230 may determine the brightness of the display module 210 to be the user-specified brightness (e.g., a1) (e.g., when the scale factor is determined to be "1"). If the region ratio is greater than or equal to the first threshold region ratio r1 and less than the second threshold region ratio r2, the processor 230 may determine the brightness of the display module 210 using a linear function that increases the scale factor as the region ratio increases. If the region ratio is greater than or equal to the second threshold region ratio r2, the processor 230 may determine the brightness of the display module 210 to be the brightness obtained by multiplying the user-specified brightness and max in Equation 5 (e.g., when the scale factor is determined to be the ratio of the maximum brightness of the display module 210 set to display an HDR image to the maximum brightness of the display module 210 capable of being set by a user).

In an embodiment, reference numeral 603 may show a graph representing the brightness of the display module 210 depending on the region ratio in the case where the function f(x) in Equation 5 is a function that increases the scale factor stepwise as the region ratio increases in the range where the region ratio is greater than or equal to the first threshold region ratio r1 and less than the second threshold region ratio r2. In reference numeral 603, if the region ratio is less than the first threshold region ratio r1, the processor 230 may determine the brightness of the display module 210 to be the user-specified brightness (e.g., a1) (e.g., when the scale factor is determined to be "1"). If the region ratio is greater than or equal to the first threshold region ratio r1 and less than the second threshold region ratio r2, the processor 230 may determine the brightness of the display module 210 using a function that increases the scale factor stepwise as the region ratio increases. If the region ratio is greater than or equal to the second threshold region ratio r2, the processor 230 may determine the brightness of the display module 210 to be the brightness (e.g., a2) obtained by multiplying the user-specified brightness and max in Equation 5.

In an embodiment, reference numeral 604 may show a graph representing the brightness of the display module 210 depending on the region ratio in the case where the function f(x) in Equation 5 is a multi-order function that increases the scale factor as the region ratio increases (or a monotone increasing function in which the scale factor does not decrease as the region ratio increases) in the range where the region ratio is greater than or equal to the first threshold region ratio r1 and less than the second threshold region ratio r2. In reference numeral 604, if the region ratio is less than the first threshold region ratio r1, the processor 230 may determine the brightness of the display module 210 to be the user-specified brightness (e.g., a1) (e.g., when the scale factor is determined to be "1"). If the region ratio is greater than or equal to the first threshold region ratio r1 and less than the second threshold region ratio r2, the processor 230 may determine the brightness of the display module 210 using a multi-order function that increases the scale factor as the region ratio increases. If the region ratio is greater than or equal to the second threshold region ratio r2, the processor 230 may determine the brightness of the display module

210 to be the brightness (e.g., a2) obtained by multiplying the user-specified brightness and max in Equation 5.

In an embodiment, FIG. 7 may be a diagram illustrating a brightness range of the display module 210 set by the processor 230 when the size of the first region increases in the display module 210. For example, in reference numeral 701, if the region ratio of the second region to the first region 710 is 0.4, the processor 230 may set the brightness of the display module 210 to be 400 Nits (e.g., set the brightness range of the display module 210 to be 0 to 400 Nits). In reference numeral 702, if the region ratio of the second region to the first region 720 is 0.6, the processor 230 may set the brightness of the display module 210 to be 600 Nits. In reference numeral 703, if the region ratio of the second region to the first region 730 is 0.8, the processor 230 may set the brightness of the display module 210 to be 800 Nits. The processor 230 may perform setting such that the brightness of the display module 210 gradually increases as the region ratio increases as shown in reference numerals 702 to 703.

On the other hand, in a comparative example, if the ratio of the region where an HDR image is to be displayed in the display module 210 to the size of the entire region of the display module 210 is 0.6, the brightness of the display module 210 may be set to be 400 Nits. In a comparative example, if the ratio of the region where an HDR image is to be displayed in the display module 210 to the size of the entire region of the display module 210 is 0.6, the brightness of the display module 210 may be set to be 1000 Nits. In a comparative example, if the ratio of the region where an HDR image is to be displayed in the display module 210 to the size of the entire region of the display module 210 is 0.8, the brightness of the display module 210 may be set to be 1000 Nits. In a comparative example, if the ratio of the region where the HDR image is to be displayed in the display to the size of the entire region of the display changes from a ratio (e.g., about 0.49) less than a specified ratio (e.g., about 0.5) to a ratio (e.g., about 0.51) greater than the same, the brightness of the display module 210 may be changed abruptly.

Referring back to FIG. 3, in an embodiment, the processor 230 may display an HDR image (or an HDR image and a non-HDR image) through the display module 210 using the brightness range of the display module 210 set in operation 307. For example, the processor 230 may display an HDR image in the first region through the display module 210 using the set brightness range of the display module 210.

In an embodiment, when the display of the HDR image is finished, the processor 230 may change the brightness of the display module 210 to a user-specified brightness. For example, after displaying the HDR image through the display module 210 using the brightness range of the display module 210 set in operation 307, if the display of the HDR image is finished due to termination of reproduction of the HDR image, the processor 230 may restore the brightness range of the display module 210 to the brightness range set by the user.

In an embodiment, if the display of the HDR image is finished, the processor 230 may gradually change the brightness of the display module 210 to the user-specified brightness. For example, the processor 230 may reduce the brightness of the display module 210 from the brightness of the display module 210 set in operation 307 to the user-specified brightness at a specified time interval. In the case where the display of the HDR image is finished, the processor 230 may gradually change the brightness of the display module 210 to the user-specified brightness, thereby preventing the brightness of the display module 210 from changing abruptly.

Although not shown in FIGS. 3 to 7, in an embodiment, the processor 230 may also increase the brightness of the display module 210 in the case of displaying a plurality of HDR images using a multi-window function or displaying an HDR image using a pop-up window function. A method for the processor 230 to increase the brightness of the display module 210 when displaying an HDR image using a multi-window function or a pop-up window function will be described in detail with reference to FIGS. 8 to 10.

Although not shown in FIGS. 3 to 7, in an embodiment, in the case where an electronic device includes a flexible display module in which a region visually exposed to the outside is expanded or reduced and where an HDR image is displayed through the flexible display module, the processor 230 may increase the brightness of the display module 210. A method for the processor 230 to increase the brightness of the display module 210 when displaying an HDR image through the flexible display module will be described in detail with reference to FIGS. 11A to 16.

Figure 8:
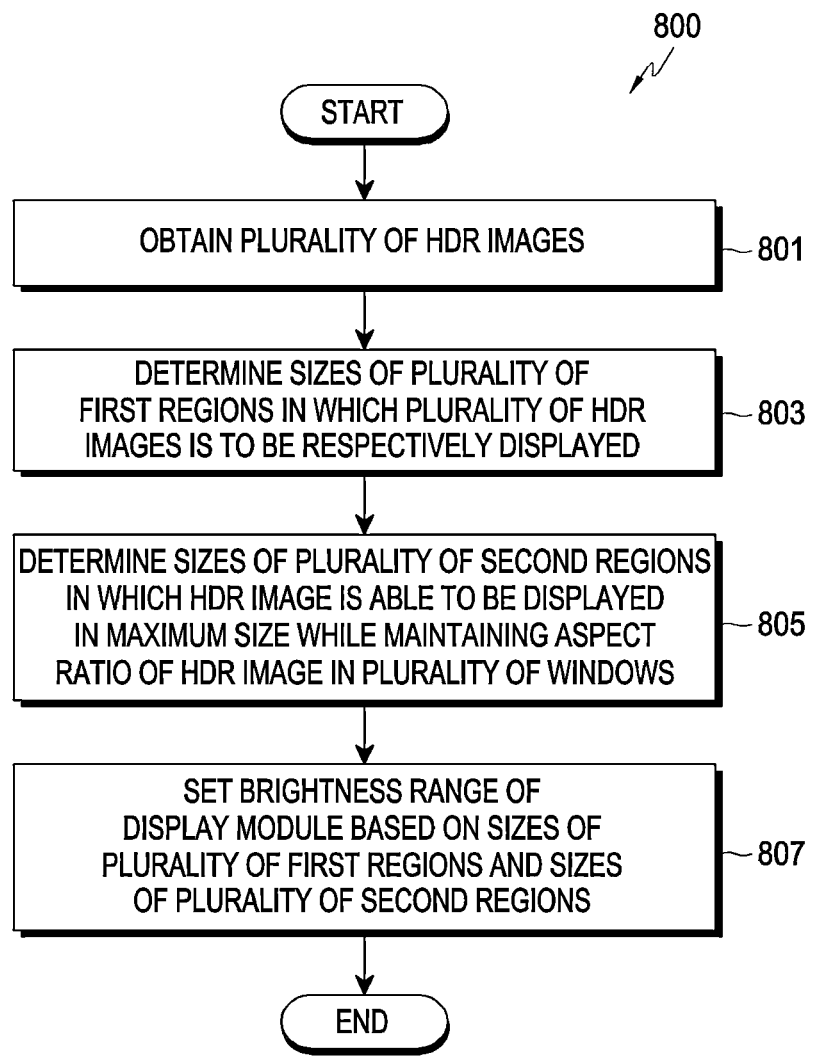
FIG. 8 is a flowchart illustrating a method of providing an image using a multi-window function according to various embodiments.

FIG. 8 is a flowchart 800 illustrating a method of providing an image using a multi-window function according to various embodiments.

Figure 9:
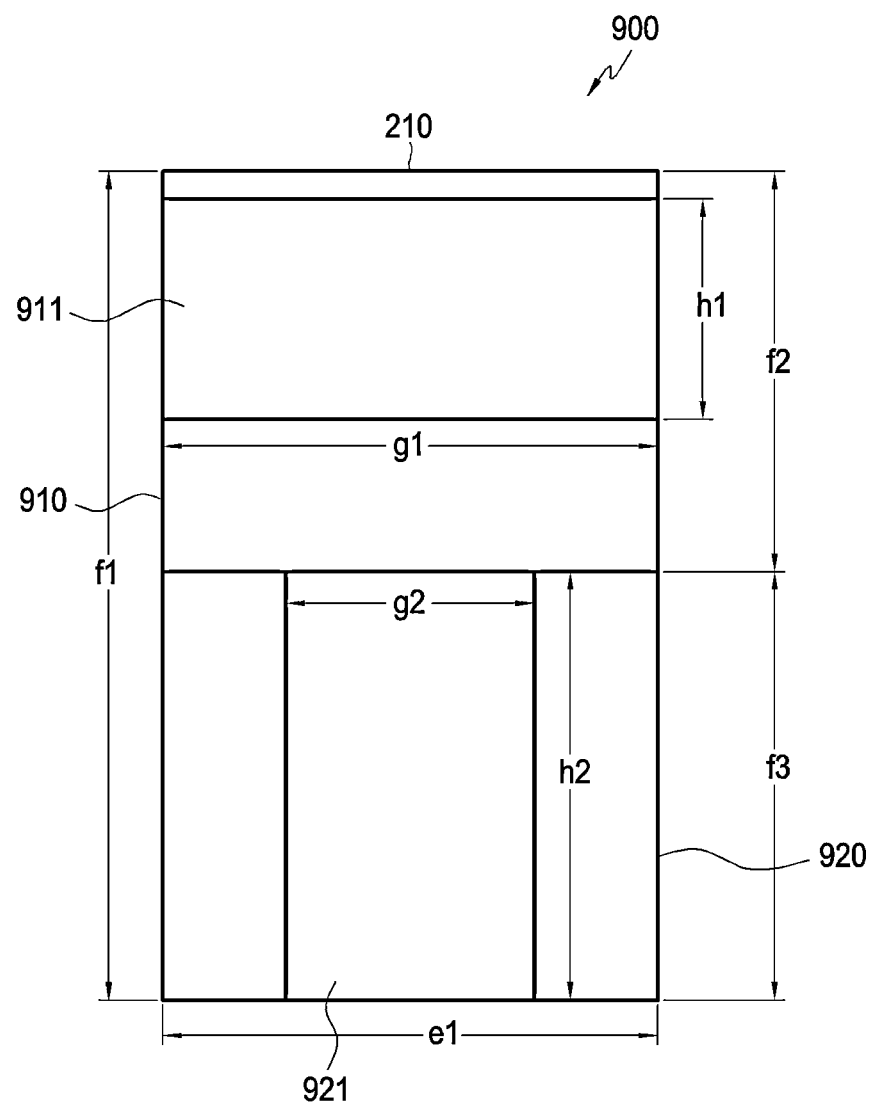
FIG. 9 is an exemplary diagram illustrating a method of providing an image using a multi-window function according to various embodiments.

FIG. 9 is an exemplary diagram 900 illustrating a method of providing an image using a multi-window function according to various embodiments.

Referring to FIGS. 8 and 9, in operation 801, in an embodiment, the processor 230 may obtain a plurality of HDR images to be displayed in a plurality of windows produced using a multi-window function. For example, the processor 230 may execute a multi-window function and, based on a user input for selecting a plurality of HDR images to be respectively displayed in the plurality of windows produced using the multi-window function, obtain a plurality of HDR images to be displayed in the plurality of windows.

In operation 803, in an embodiment, the processor 230 may determine sizes of a plurality of first regions in which a plurality of HDR images is to be respectively displayed in the plurality of windows.

In an embodiment, the processor 230 may determine sizes of a plurality of first regions, based on the resolutions of the plurality of HDR images, the size of the first window and the size of the second window, and/or settings of applications for displaying the plurality of HDR images, respectively.

In operation 805, in an embodiment, the processor 230 may determine sizes of a plurality of second regions in which an HDR image is able to be displayed in a maximum size while maintaining the aspect ratio of the HDR image in the plurality of windows. For example, the processor 230 may determine the size of each of the plurality of second regions, based on Equation 6 to Equation 9 below.

$$\text{Third ratio} = \frac{\text{Max}(W_{window}, H_{window})}{\text{Min}(W_{window}, H_{window})} \quad \text{[Equation 6]}$$

In Equation 6, $W_{window}$ may represent the horizontal length of the window, $H_{window}$ may represent the vertical length of the window, $\text{Max}(W_{window}, H_{window})$ may represent the longer one of the horizontal length of the window and the vertical length of the display module 210, and $\text{Min}(W_{window},$ $H_{window}$) may represent the shorter one of the horizontal length of the window and the vertical length of the display module 210.

$$\text{Fourth ratio} = \frac{\text{Max}(W_{video}, H_{video})}{\text{Min}(W_{video}, H_{video})} \quad \text{[Equation 7]}$$

In Equation 7, $W_{video}$ may represent the horizontal length of a region where the HDR image is to be displayed within the window (or the horizontal value of the resolution of the HDR image), $H_{video}$ may represent the vertical length of the region where the HDR image is to be displayed within the window (or the vertical value of the resolution of the HDR image), Max($W_{video}$, $H_{video}$) may represent the longer one of the horizontal length and the vertical length of the region where the HDR image is to be displayed within the window, and Min($W_{video}$, $H_{video}$) may represent the shorter one of the horizontal length and the vertical length of the region where the HDR image is to be displayed within the window.

If third ratio is greater than or equal to fourth ratio,
size of second region=Min($W_{window}$,$H_{window}$)×
{Min($W_{window}$,$H_{window}$)×(fourth ratio)}  [Equation 8]

If third ratio is less than fourth ratio,size of second
region=Max($W_{window}$,$H_{window}$)×{Max($W_{window}$,
$H_{window}$)/(fourth ratio)}  [Equation 9]

Referring to Equation 6 to Equation 9, if the third ratio calculated using Equation 6 is greater than or equal to the fourth ratio calculated using Equation 7, the processor 230 may calculate the size of the second region using Equation 8. If the third ratio calculated using Equation 6 is less than the fourth ratio calculated using Equation 7, the processor 230 may calculate the size of the second region using Equation 9.

In an embodiment, the processor 230 may determine the sizes of a plurality of second regions for each of the plurality of windows using Equation 6 to Equation 9. For example, in FIG. 9, the horizontal length and vertical length of the display module 210 may be e1 and f1 (f1>e1), respectively. The horizontal length and vertical length of a window 1 (910) may be e1 and f2, respectively, and the horizontal length and vertical length of a window 2 (920) may be e1 and f3, respectively. The horizontal length and vertical length of a 1-1$^{st}$ region 911 in which HDR image 1 is to be displayed through the window 1 (910) may be g1 (=e1) and h1, respectively, and the horizontal length and vertical length of the 1-2$^{nd}$ region 921 in which HDR image 2 is to be displayed through the window 2 (920) may be g2 and h2 (=f3), respectively. Based on the horizontal length and vertical length of the window 1 (910) and the horizontal length and vertical length of the 1-1$^{st}$ region 911, the processor 230 may determine the size of the 2-1$^{st}$ region as the second region for HDR image 1 using Equation 6 to Equation 9. Based on the horizontal length and vertical length of the window 2 and the horizontal length and vertical length of the 1-2$^{nd}$ region 921, the processor 230 may determine the size of the 2-2$^{nd}$ region as the second region for HDR image 2 using Equation 6 to Equation 9.

In operation 807, in an embodiment, the processor 230 may set a brightness range of the display module 210, based on the sizes of the plurality of first regions and the sizes of the plurality of second regions.

In an embodiment, the processor 230 may determine a region ratio, based on sizes of the plurality of first regions and the sizes of the plurality of second regions. For example, the region ratio may be defined as a ratio of the sizes of the plurality of second regions to the sum of the sizes of the plurality of first regions.

In an embodiment, the processor 230 may determine a scale factor, based on the region ratio. In an embodiment, the processor 230 may set a brightness range of the display module 210, based on the determined scale factor. An operation in which the processor 230 determines the scale factor, based on the region ratio, and an operation in which the processor 230 sets the brightness range of the display module 210, based on the scale factor, are at least partially the same as or similar to operation 503 in FIG. 5 in which the processor 230 determines the scale factor, based on the region ratio, and operation 505 in FIG. 5 in which the processor 230 sets the brightness range of the display module 210, based on the scale factor, so detailed descriptions thereof will be omitted.

Figure 10:
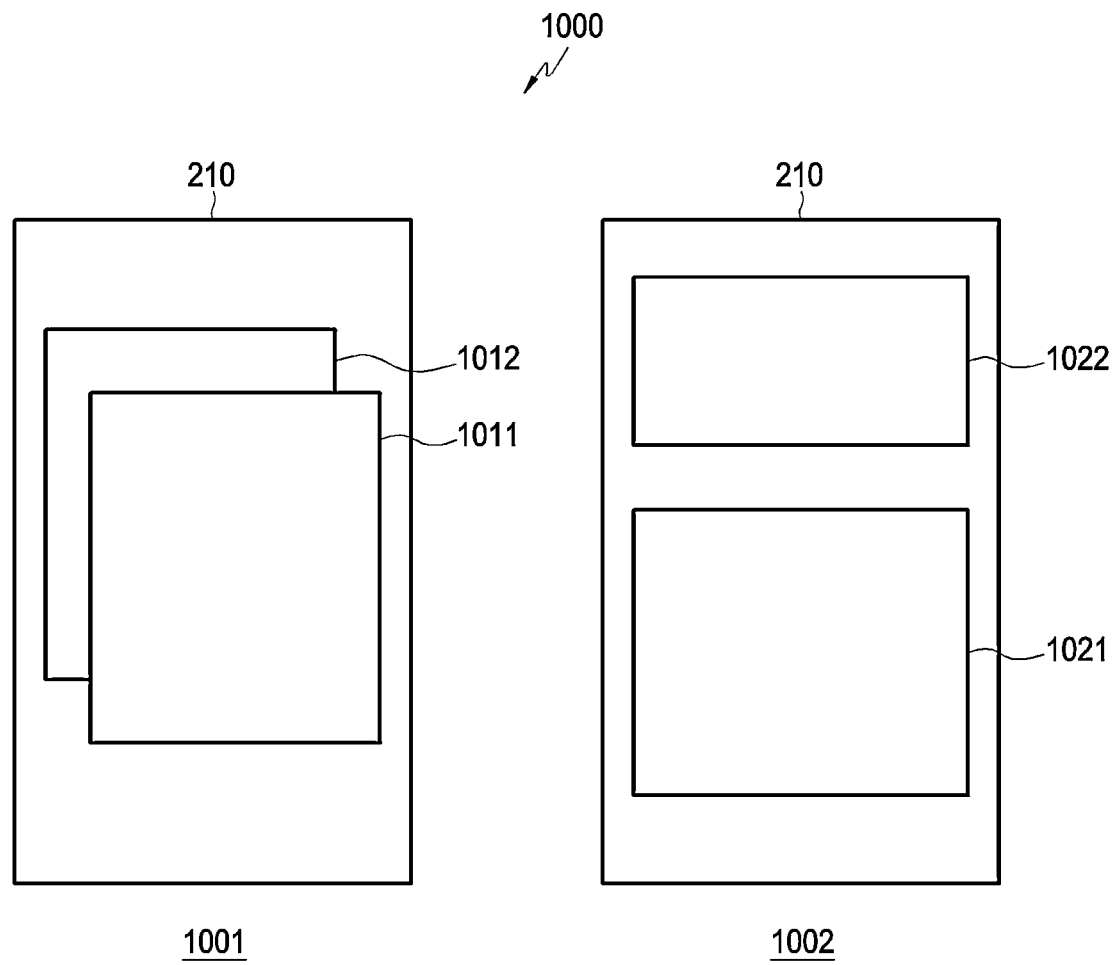
FIG. 10 is an exemplary diagram illustrating a method of providing an image using a pop-up window function according to various embodiments.

FIG. 10 is an exemplary diagram 1000 illustrating a method of providing an image using a pop-up window function according to various embodiments.

Referring to FIG. 10, in an embodiment, the processor 230 may obtain one or more HDR images to be displayed in one or more windows produced using a pop-up window function. For example, the processor 230 may execute a pop-up window function and, based on a user input for selecting one or more HDR images to be respectively displayed in one or more windows produced using the pop-up window function, obtain one or more HDR images to be displayed in one or more windows.

In an embodiment, the processor 230 may display a plurality of HDR images through a plurality of windows produced using a pop-up window function. For example, as shown by reference numeral 1001, the processor 230 may display a first window 1011 and a second window 1012, which are produced using a pop-up window function, through the display module 210 such that the first window 1011 and the second window 1012 overlap each other. As another example, as shown by reference numeral 1002, the processor 230 may display a third window 1021 and a fourth window 1022, which are produced using a pop-up window function, through the display module 210 such that the third window 1021 and the fourth window 1022 do not overlap each other.

In an embodiment, in the case where a plurality of windows produced using a pop-up window function is displayed to overlap each other, the processor 230 may set the brightness range of the display module 210, based on an HDR image displayed through a window (hereinafter referred to as a "first window") arranged at the top of the display module 210 among the plurality of windows (e.g., a plurality of layers corresponding to respective ones of the plurality of windows) (e.g., the uppermost layer among the plurality of layers corresponding to respective ones of the plurality of windows) (e.g., determine an HDR image displayed in the first window as the HDR image for determining the first region in operation 303 and the second region in operation 305). For example, the processor 230 may determine the size of the first region where an HDR image is to be displayed in the first window. The processor 230 may determine the size of the second region using Equation 1 to Equation 4. The processor 230 may set the brightness range of the display module 210, based on the size of the first region and the size of the second region. Since an operation in which the processor 230 sets the brightness range of the display module 210, based on the size of the first region and the size of the second region, is at least partially the same as or similar to operation 307 in FIG. 3 in which the processor 230 sets the brightness range of the display module 210, based on the size of the first region and the size of the second region, a detailed description thereof will be omitted.

In an embodiment, in the case where a plurality of windows produced using a pop-up window function is displayed so as not to overlap, the processor 230 may determine a plurality of first regions (and sizes of a plurality of first regions) of a plurality of HDR images to be displayed on respective ones of the plurality of windows. The processor 230 may determine sizes of the plurality of second regions using Equation 1 to Equation 4 for each of the plurality of HDR images. For example, in the case where HDR image 1 is displayed on the third window 1021 and where HDR image 2 is displayed on the fourth window 1022, the processor 230, based on horizontal and vertical lengths of a 1-1$^{st}$ region of HDR image 1 (e.g., a first region where HDR image 1 is to be displayed), horizontal and vertical lengths of a 1-2$^{nd}$ region of HDR image 2 (e.g., a first region where HDR image 2 is to be displayed), and horizontal and vertical lengths of the display module 210, may determine the size of a 2-1$^{st}$ region (e.g., the size of a second region determined based on the 1-1$^{st}$ region of HDR image 1 and the horizontal and vertical lengths of the display module 210) and the size of a 2-2$^{nd}$ region (e.g., the size of a second region determined based on the 1-2$^{nd}$ region of HDR image 2 and the horizontal and vertical lengths of the display module 210).

In an embodiment, the processor 230 may determine a plurality of region ratios, based on the sizes of the plurality of first regions and the sizes of the plurality of second regions. For example, in the case where HDR image 1 is displayed on the third window 1021 and where HDR image 2 is displayed on the fourth window 1022, the processor 230 may determine a first region ratio as the ratio of the 1-1$^{st}$ region to the 2-1$^{st}$ region and determine a second region ratio as the ratio of the 1-2$^{nd}$ region to the 2-2$^{nd}$ region.

In an embodiment, the processor 230 may determine a region ratio for setting the brightness range of the display module 210, based on the plurality of region ratios and weights assigned (e.g., given) to the plurality of region ratios. For example, the processor 230, based on the plurality of region ratios and weights assigned (e.g., given) to the plurality of region ratios, may determine a region ratio using Equation 10 and Equation 11 below.

$$\text{region ratio} = \Sigma_{k \in N} r_k W_k \quad \text{[Equation 10]}$$

$$\Sigma_{k \in N} W_k = 1 \quad \text{[Equation 11]}$$

In Equation 10, $r_k$ may represent each of a plurality of region ratios, and $W_k$ may represent a weight assigned to each of the plurality of region ratios. In Equation 11, the sum of weights assigned to respective ones of the plurality of region ratios may be 1. In Equation 10 and Equation 11, N may be the number of a plurality of windows (or the number of a plurality of HDR images displayed on the respective windows).

In an embodiment, the processor 230 may set a weight of the same value for the plurality of region ratios. For example, in case where the number of the plurality of region ratios is two, the processor 230 may set a weight of 0.5 for each of the plurality of region ratios.

In an embodiment, the processor 230 may set a higher weight for a region ratio having a big sized first region than a weight for a region ratio having a small sized first region. For example, in reference numeral 1002, if the size of the 1-1$^{st}$ region of HDR image 1 through the third window 1021 is greater than the size of the 1-2$^{nd}$ region of HDR image 2 through the fourth window 1022, the processor 230 may set a weight, which is higher than a weight for the second region ratio determined based on the size of the 1-2$^{nd}$ region, for the first region ratio determined based on the size of the 1-1$^{st}$ region.

In an embodiment, when the region ratio (e.g., the region ratio determined through Equation 10) is determined, the processor 230 may determine a scale factor, based on the region ratio. The processor 230 may set a brightness range of the display module 210, based on the determined scale factor. Since an operation in which the processor 230 determines the scale factor, based on the region ratio, and an operation in which the processor 230 sets the brightness range of the display module 210, based on the scale factor, are at least partially the same as or similar to operation 503 in FIG. 5 in which the processor 230 determines the scale factor, based on the region ratio, and operation 505 in FIG. 5 in which the processor 230 sets the brightness range of the display module 210, based on the scale factor, detailed descriptions thereof will be omitted.

In the above-described examples, although it has been described that the brightness range of the display module 210 is set based on the HDR image displayed through the first window in the case where a plurality of windows produced using the pop-up window function is displayed to overlap, the disclosure is not limited thereto. For example, the examples of setting the brightness range of the display module 210 described in the case where a plurality of windows produced using the pop-up window function is displayed so as not to overlap (e.g., the examples of determining a region ratio for setting the brightness range of the display module 210, based on a plurality of region ratios and weights assigned to the plurality of region ratios) may also be applied to the case where a plurality of windows produced using the pop-up window function is displayed to overlap in the same or similar manner.

A method of providing an image in an electronic device 101 according to various embodiments may include obtaining an HDR image, determining a size of a first region where the HDR image is to be displayed in a display module 210 of the electronic device 101, determining a size of a second region where the HDR image is able to displayed in a maximum size while maintaining an aspect ratio of the HDR image in the display module 210, and setting a brightness range of the display module 210, based on the size of the first region and the size of the second region.

In various embodiments, the aspect ratio of the HDR image may be a ratio of a vertical value of a resolution of the HDR image to a horizontal value of the resolution of the HDR image, and the second region may be a region having a maximum size among regions capable of displaying the HDR image while maintaining the aspect ratio of the HDR image in the display module 210.

In various embodiments, the setting of the brightness range of the display module 210 may include determining a region ratio that is a ratio of the size of the first region to the size of the second region, determining a scale factor, based on the region ratio, and setting the brightness range of the display module 210, based on the scale factor.

In various embodiments, the scale factor may increase as the region ratio increases in a specified section of the region ratio.

In various embodiments, the setting of the brightness range of the display module 210, based on the scale factor, may include, if the region ratio is less than a minimum value of the specified section, setting the brightness range of the display module 210, based on a first brightness of the display module 210 set by a user, if the region ratio is greater than or equal to the minimum value of the specified section and less than a maximum value of the specified section, setting the brightness range of the display module 210, based on the scale factor, which increases as the region ratio increases in the specified section, and the first brightness, and if the region ratio is greater than or equal to the maximum value of the specified section, setting the brightness range of the display module 210, based on the scale factor determined as a ratio of the maximum brightness of the display module 210 set to display the HDR image to the maximum brightness of the display module 210 capable of being set by the user and the first brightness.

In various embodiments, the determining of the region ratio may include, if the HDR image includes a plurality of HDR images, determining sizes of a plurality of first regions where the plurality of HDR images is to be displayed in the display module 210, determining sizes of a plurality of second regions where the HDR image is able to be displayed in the maximum size while maintaining the aspect ratio of the HDR image in the display module 210, determining a plurality of region ratios, based on the sizes of the plurality of first regions and the sizes of the plurality of second regions, and determining the region ratio, based on the plurality of region ratios and a plurality of weights assigned to respective ones of the plurality of region ratios.

In various embodiments, the method may further include, if the HDR image includes a plurality of HDR images and if the plurality of HDR images is respectively displayed in a plurality of windows produced by a multi-window function, determining sizes of a plurality of first regions where the plurality of HDR images is to be displayed in the plurality of windows, determining sizes of a plurality of second regions where the HDR image is able to be displayed in the maximum size while maintaining the aspect ratio of the HDR image in the plurality of windows, and setting the brightness range of the display module 210, based on the sizes of the plurality of first regions and the sizes of the plurality of second regions.

In various embodiments, the method may further include, if the HDR image includes one or more HDR images and if the one or more HDR images are produced by a pop-up window function and respectively displayed in one or more windows that at least partially overlap each other, identifying a window disposed at the top of the display module 210 among the one or more windows, and determining an HDR image displayed in the window as the HDR image for determining the first region and the second region.

Figure 11A:
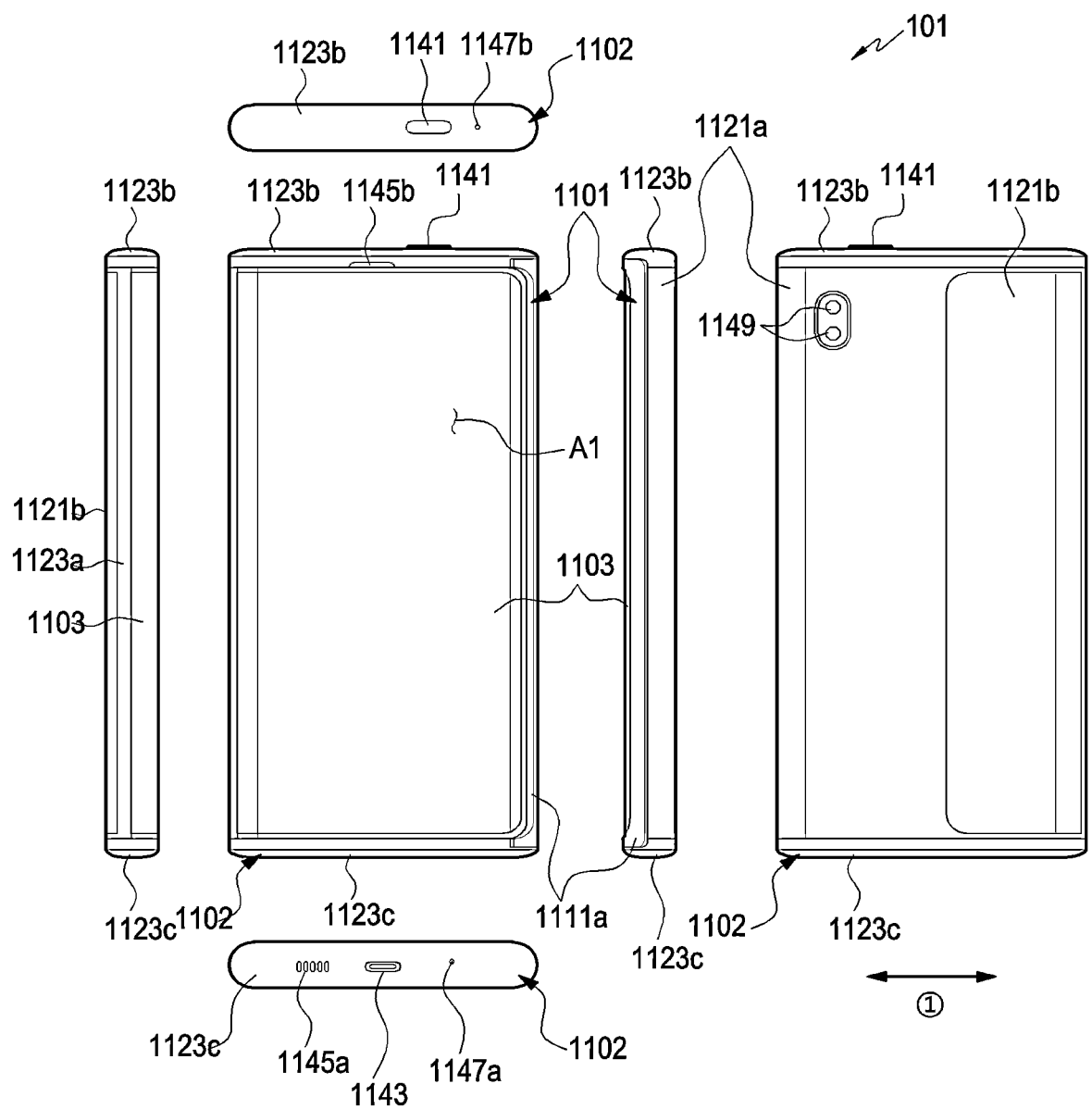
FIGS. 11A and 11B are diagrams illustrating an electronic device including a slidable display according to various embodiments.
Figure 11B:
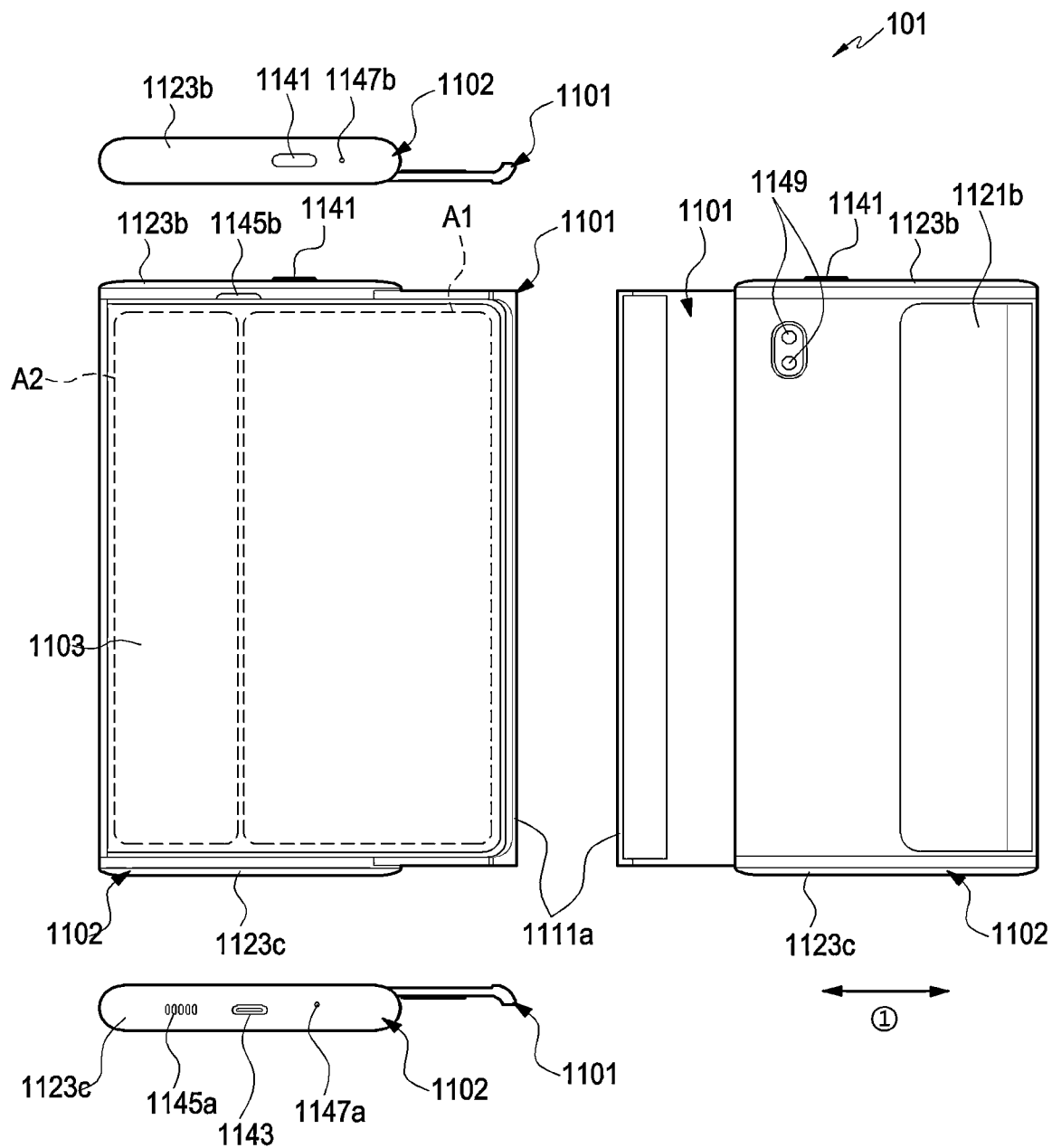

FIGS. 11A and 11B are diagrams illustrating an electronic device including a slidable display according to various embodiments.

In an embodiment, FIG. 11A may be a diagram illustrating the state in which a portion (e.g., a second region A2) of a slidable display (e.g., a display 1103 or the display module 210) is received inside a second structure 1102. In an embodiment, FIG. 11B may be a diagram illustrating the state in which most of the slidable display (e.g., the display 1103) is exposed to the outside of the second structure 1102.

The state illustrated in FIG. 11A may be defined as a state in which a first structure 1101 is closed with respect to the second structure 1102, and the state illustrated in FIG. 11B may be defined as a state in which the first structure 1101 is open with respect to the second structure 1102. According to an embodiment, a "closed state" or an "open state" may be defined as a state in which the electronic device is closed or opened.

Referring to FIGS. 11A and 11B, the electronic device 101 may include a first structure 1101 and a second structure 1102 movably disposed in the first structure 1101. In some embodiments, it may be interpreted as a structure in which the first structure 1101 is disposed to slide on the second structure 1102 in the electronic device 101. According to an embodiment, the first structure 1101 may be disposed to reciprocate by a predetermined distance in a direction shown with respect to the second structure 1102, for example, a direction indicated by arrow ①.

According to various embodiments, the first structure 1101 may be referred to as, for example, a first housing, a slide part, or a slide housing, and may be disposed to reciprocate on the second structure 1102. In an embodiment, the second structure 1102 may be referred to as, for example, a second housing, a main part, or a main housing, and may accommodate various types of electrical and electronic components such as a main circuit board or a battery. A portion (e.g., a first region A1) of the display 1103 (e.g., the display module 210) may be mounted on the first structure 1101. In some embodiments, as the first structure 1101 moves (e.g., slides) relative to the second structure 1102, another portion (e.g., the second region A2) of the display 1103 may be received inside the second structure 1102 (e.g., a slide-in operation) or may be exposed to the outside of the second structure 1102 (e.g., a slide-out operation).

According to various embodiments, the first structure 1101 may include a first plate 1111a (e.g., a slide plate), and may include a first surface formed to include at least a portion of the first plate 1111a and a second surface facing in the opposite direction of the first surface. According to an embodiment, the second structure 1102 may include a second plate 1121a (e.g., a rear case), a first sidewall 1123a extending from the second plate 1121a, a second sidewall 1123b extending from the first sidewall 1123a and the second plate 1121a, a third sidewall 1123c extending from the first sidewall 1123a and the second plate 1121a and parallel to the second sidewall 1123b, and/or a rear plate 1121b (e.g., a rear window). In some embodiments, the second sidewall 1123b and the third sidewall 1123c may be formed perpendicular to the first sidewall 1123a. According to an embodiment, the second plate 1121a, the first sidewall 1123a, the second sidewall 1123b, and the third sidewall 1123c may be formed to be open at one side (e.g., the front face) thereof to receive (or surround) at least a portion of the first structure 1101. For example, the first structure 1101 may be coupled to the second structure 1102 so as to be at least partially wrapped thereby, and slide in a direction parallel to the first surface or the second surface, for example, the direction of arrow C), by being guided by the second structure 1102.

According to various embodiments, the second sidewall 1123b or the third sidewall 1123c may be omitted. According to an embodiment, the second plate 1121a, the first sidewall 1123a, the second sidewall 1123b, and/or the third sidewall 1123c may be formed as separate structures and then combined or assembled. The rear plate 1121b may be coupled to surround at least a portion of the second plate 1121a. In some embodiments, the rear plate 1121b may be formed to be substantially integral with the second plate 1121a. According to an embodiment, the second plate 1121a or the rear plate 1121b may cover at least a portion of the display 1103. For example, the display 1103 may be at least partially received inside the second structure 1102, and the second plate 1121a or the rear plate 1121b may cover a portion of the display 1103 received inside the second structure 1102.

According to various embodiments, the first structure 1101 may move to an open state and a closed state with respect to the second structure 1102 in a first direction (e.g., direction ①) parallel to the second plate 1121*a* (e.g., the rear case) and the second sidewall 1123*b*, and may move such that the first structure 1101 is placed at a first distance from the first sidewall 1123*a* in the closed state and a second distance greater than the first distance from the first sidewall 1123*a* in the open state. In some embodiments, in the closed state, the first structure 1101 may be positioned to surround a portion of the first sidewall 1123*a*.

According to various embodiments, the second structure 1102 may include at least a portion of a non-conductive material (e.g., a polymer material (e.g., plastic), glass, or ceramic). For example, the second structure 1102 may be formed by combining a conductive housing and a plate formed of a polymer material.

According to various embodiments, the electronic device 101 may include a display 1103, a key input device 1141, a connector hole 1143, audio modules 1145*a*, 1145*b*, 1147*a*, and 1147*b*, or a camera module 1149. Although not shown, the electronic device 101 may further include an indicator (e.g., an LED device) or various sensor modules.

According to various embodiments, the display 1103 may include a first region A1 and a second region A2. In an embodiment, the first region A1 may extend to substantially across at least a portion of the first surface to be disposed on the first surface. The second region A2 may extend from the first region A1 and may be inserted or received inside the second structure 1102 (e.g., the housing) or exposed to the outside of the second structure 1102 according to sliding movement of the first structure 1101. As will be described later, the second region A2 may be substantially moved while being guided by a roller (not shown) mounted to the second structure 1102 to be received inside the second structure 1102 or exposed to the outside. For example, while the first structure 1101 slides, a portion of the second region A2 may be deformed into a curved shape at a position corresponding to the roller.

According to various embodiments, when viewed from the top of the first plate 1111*a* (e.g., a slide plate), if the first structure 1101 moves from the closed state to the open state, the second region A2 may be gradually exposed to the outside of the second structure 1102, thereby forming a plane with the first region A1. The display 1103 may be coupled to or disposed adjacent to a touch detection circuit, a pressure sensor capable of measuring the intensity (pressure) of a touch, and/or a digitizer that detects a magnetic-field type stylus pen. In an embodiment, the second region A2 may be at least partially received inside the second structure 1102, and even in the state shown in FIG. 11A (e.g., the closed state), a portion of the second region A2 may be visually exposed to the outside of the second region A2. In some embodiments, regardless of the closed state or the open state, a portion of the exposed second region A2 may be positioned on the roller, and a portion of the second region A2 maintains a curved shape at a position corresponding to the roller.

The key input device 1141 may be disposed on the second sidewall 1123*b* or the third sidewall 1123*c* of the second structure 1102. The electronic device 101 may be designed to exclude the illustrated key input device 1141 or include additional key input devices depending on the appearance and usage state. In some embodiments, the electronic device 101 may include a key input device that is not shown, for example, a home key button or a touch pad disposed around the home key button. According to another embodiment, at least a portion of the key input device 1141 may be positioned in one region of the first structure 1101.

According to various embodiments, the connector hole 1143 may be omitted according to embodiments and accommodate a connector (e.g., a USB connector) for transmitting and receiving power and/or data to and from an external electronic device. Although not shown, the electronic device 101 may include a plurality of connector holes 1143, and some of the plurality of connector holes 1143 may function as connector holes for transmitting and receiving audio signals to and from an external electronic device. Although the connector hole 1143 is disposed on the third sidewall 1123*c* in the illustrated embodiment, the disclosure is not limited thereto, and the connector hole 1143 or an unillustrated connector hole may be disposed on the first sidewall 1123*a* or the second sidewall 1123*b*.

According to various embodiments, the audio modules 1145*a*, 1145*b*, 1147*a*, and 1147*b* may include speaker holes 1145*a* and 1145*b* or microphone holes 1147*a* and 1147*b*. One of the speaker holes 1145*a* and 1145*b* may be provided as a receiver hole for a voice call, and the remaining one may be provided as an external speaker hole. A microphone for acquiring an external sound may be disposed in the microphone holes 1147*a* and 1147*b*, and in some embodiments, a plurality of microphones may be disposed to detect the direction of sound. In some embodiments, the speaker holes 1145*a* and 1145*b* and the microphone holes 1147*a* and 1147*b* may be implemented as a single hole, or a speaker (e.g., a piezo speaker) may be included without the speaker holes 1145*a* and 1145*b*. According to an embodiment, the speaker hole indicated by reference number "1145*b*" may be disposed in the first structure 1101 and may be used as a receiver hole for a voice call, and the speaker hole (e.g., an external speaker hole) indicated by reference number "1145*a*" or the microphone holes 1147*a* and 1147*b* may be disposed in the second structure 1102 (e.g., one of the sidewalls 1123*a*, 1123*b*, and 1123*c*).

The camera module 1149 may be provided in the second structure 1102 and may photograph a subject in a direction opposite to the first region A1 of the display 1103. The electronic device 101 may include a plurality of camera modules 1149. For example, the electronic device 101 may include a wide-angle camera, a telephoto camera, or a close-up camera, and include an infrared projector and/or an infrared receiver, depending on an embodiment, to measure a distance to a subject. The camera module 1149 may include one or more lenses, an image sensor, and/or an image signal processor 230. Although not shown, the electronic device 101 may further include a camera module (e.g., a front camera) for photographing a subject in the opposite direction of the first region A1 of the display 1103. For example, the front camera may be disposed around the first region A1 or in a region overlapping the display 1103 and may photograph a subject by passing through the display 1103 in the case of being disposed in the region overlapping the display 1103.

According to various embodiments, an indicator (not shown) of the electronic device 101 may be disposed in the first structure 1101 or the second structure 1102 and include a light-emitting diode to provide state information of the electronic device 101 as a visual signal. A sensor module (not shown) of the electronic device 101 may produce an electrical signal or data value corresponding to an internal operation state of the electronic device 101 or an external environmental state. The sensor module may include, for example, a proximity sensor, a fingerprint sensor, or a biometric sensor (e.g., an iris/face recognition sensor or an HRM sensor). In another embodiment, a sensor module, for example, at least one of a gesture sensor, a gyro sensor, an atmosphere pressure sensor, a magnetic sensor, an acceleration sensor, a grip sensor, a color sensor, an infrared (IR) sensor, a temperature sensor, a humidity sensor, or an illuminance sensor may be included.

Figure 12:
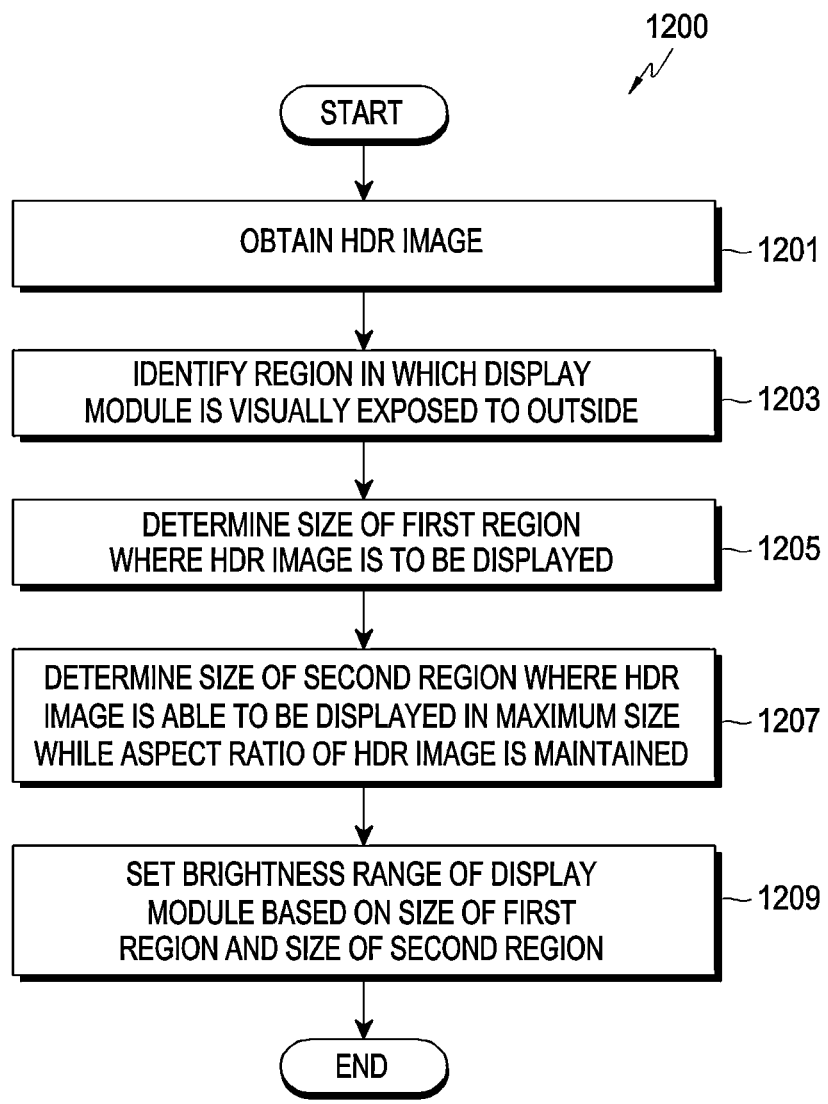
FIG. 12 is a flowchart illustrating a method of providing an image in an electronic device including a slidable display according to various embodiments.

FIG. 12 is a flowchart 1200 illustrating a method of providing an image in an electronic device 101 including a slidable display according to various embodiments.

Referring to FIG. 12, in operation 1201, in an embodiment, the processor 230 may obtain an HDR image.

Since an operation of the processor 230 for obtaining the HDR image is at least partially the same as or similar to the operation of the processor 230 for obtaining the HDR image in operation 301 in FIG. 3, a detailed description thereof will be omitted.

In operation 1203, in an embodiment, a region in which the display module 210 (e.g., the display 1103) is visually exposed to the outside (hereinafter referred to as a "display region" or a "display region of the display module 210") may be identified.

In an embodiment, the processor 230 may identify the display region of the display module 210 through a sensor. For example, when the first structure 1101 slides in the horizontal direction on the second structure 1102, the processor 230 may identify the horizontal length of the display region of the display 1103, which changes with the sliding movement of the first structure 1101, through a sensor, thereby identifying the display region of the display 1103. In an embodiment, the sensor used to identify the display region of the display module 210 may include at least one of a Hall sensor, an optical sensor, an inertial sensor, a pressure sensor, an illuminance sensor, or a rotation angle sensor. However, the sensor used to identify the display region of the display module 210 is not limited to the above-described sensors.

In operation 1205, in an embodiment, the processor 230 may determine the size of a first region where an HDR image is to be displayed in the display region of the display module 210.

In an embodiment, the processor 230 may determine the size of the first region where an HDR image is to be displayed in the display region of the display module 210, based on resolution of an HDR image, the size of the display region of the display module 210 (e.g., horizontal and vertical lengths of the display region of the display module 210), and/or setting of an application for displaying the HDR image.

In operation 1207, in an embodiment, the processor 230 may determine the size of a second region where the HDR image is able to be displayed in the maximum size while the aspect ratio of the HDR image is maintained in the display region of the display module 210. For example, the processor 230 may substitute the horizontal length ($W_{display}$) and the vertical length ($H_{display}$) of the display module 210 with the horizontal length and the vertical length of the display region of the display module 210, respectively, in Equation 1, Equation 3, and Equation 4, and determine the size of the second region using the substituted Equation 1, Equation 3, and Equation 4, and Equation 2.

In operation 1209, in an embodiment, the processor 230 may set a brightness range of the display module 210, based on the size of the first region and the size of the second region.

A method for the processor 230 to set the brightness range of the display module 210, based on the size of the first region and the size of the second region, is at least partially the same as or similar to the methods described in operation 505 in FIG. 3 and operations 501 to 505 in FIG. 5, a detailed description thereof will be omitted.

Figure 13:
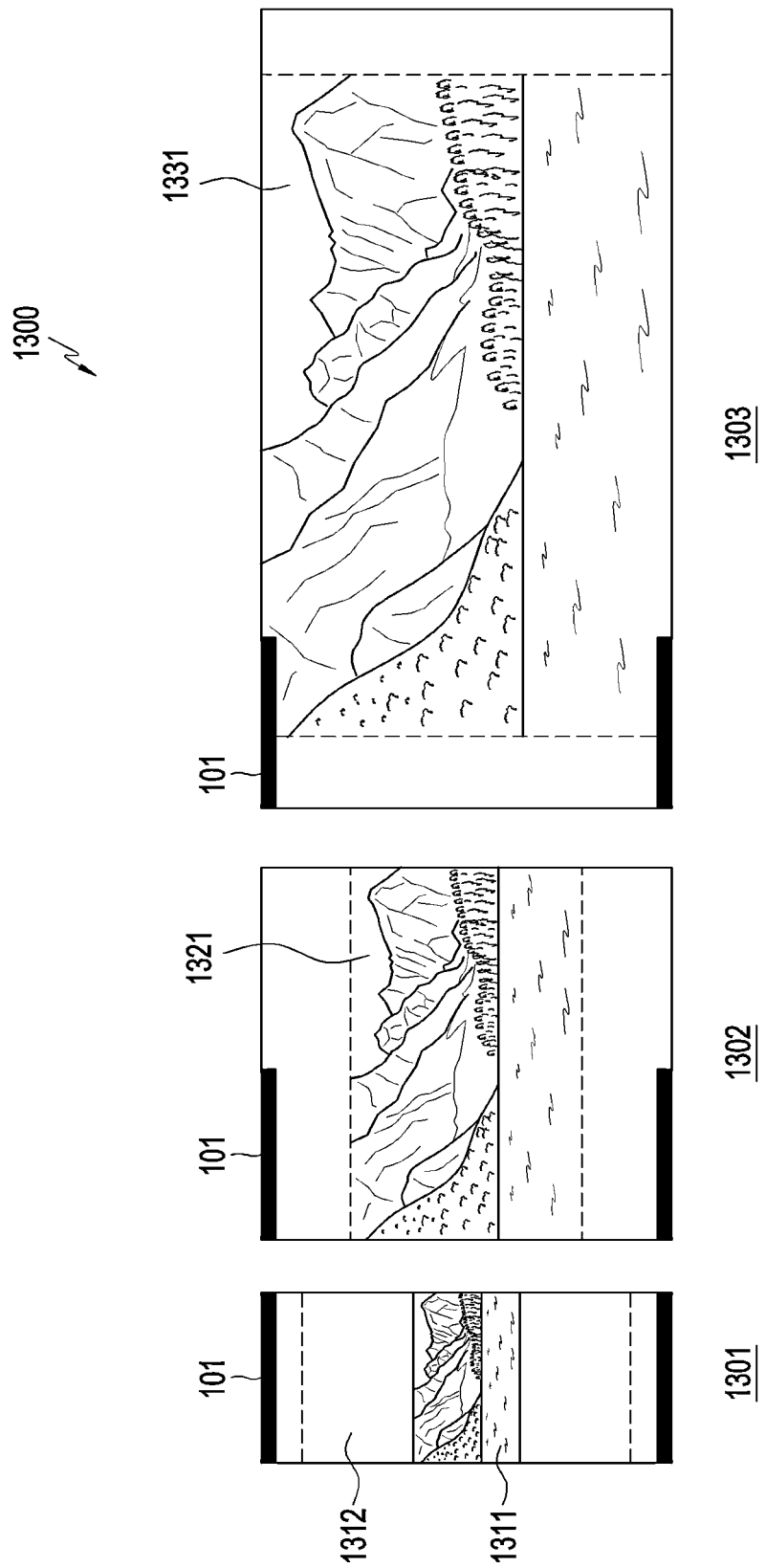
FIG. 13 is an exemplary diagram illustrating a method of providing an image in an electronic device including a slidable display according to various embodiments.

FIG. 13 is an exemplary diagram 1300 illustrating a method of providing an image in an electronic device 101 including a slidable display according to various embodiments.

Figure 14:
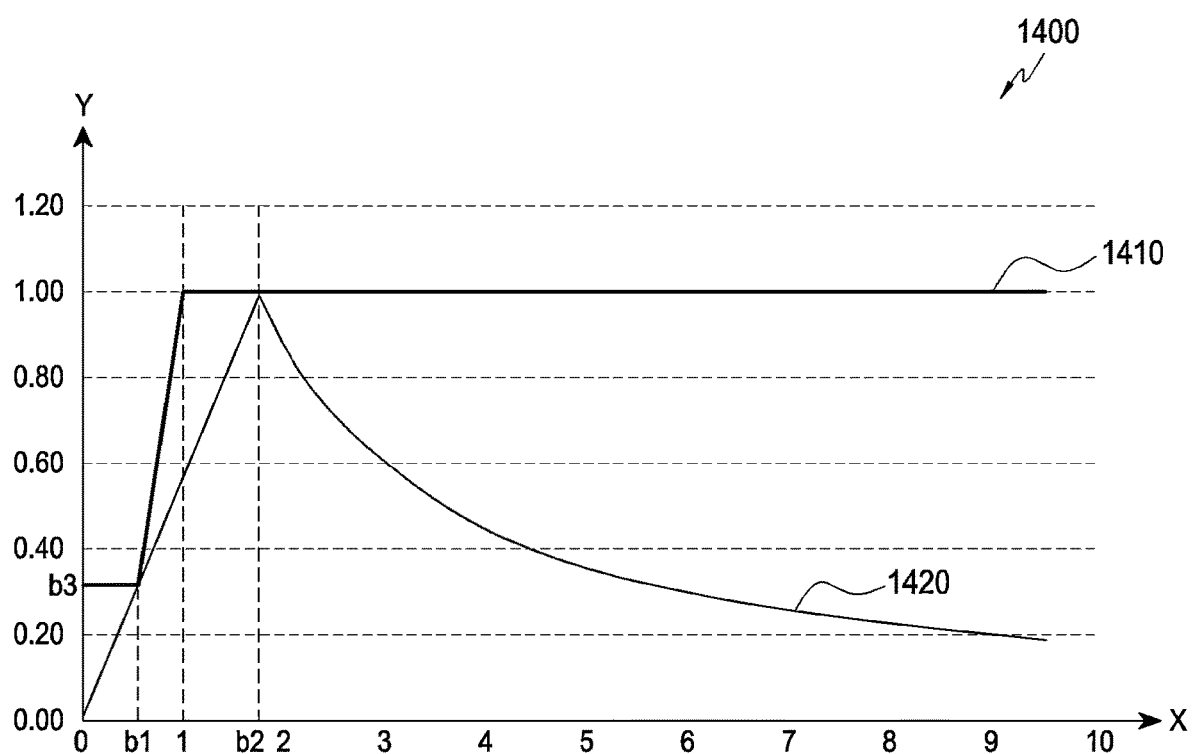
FIG. 14 is an exemplary diagram illustrating a region ratio determined when a display region changes in an electronic device including a slidable display according to various embodiments.

FIG. 14 is an exemplary diagram 1400 illustrating a region ratio determined when a display region changes in an electronic device 101 including a slidable display according to various embodiments.

Figure 15:
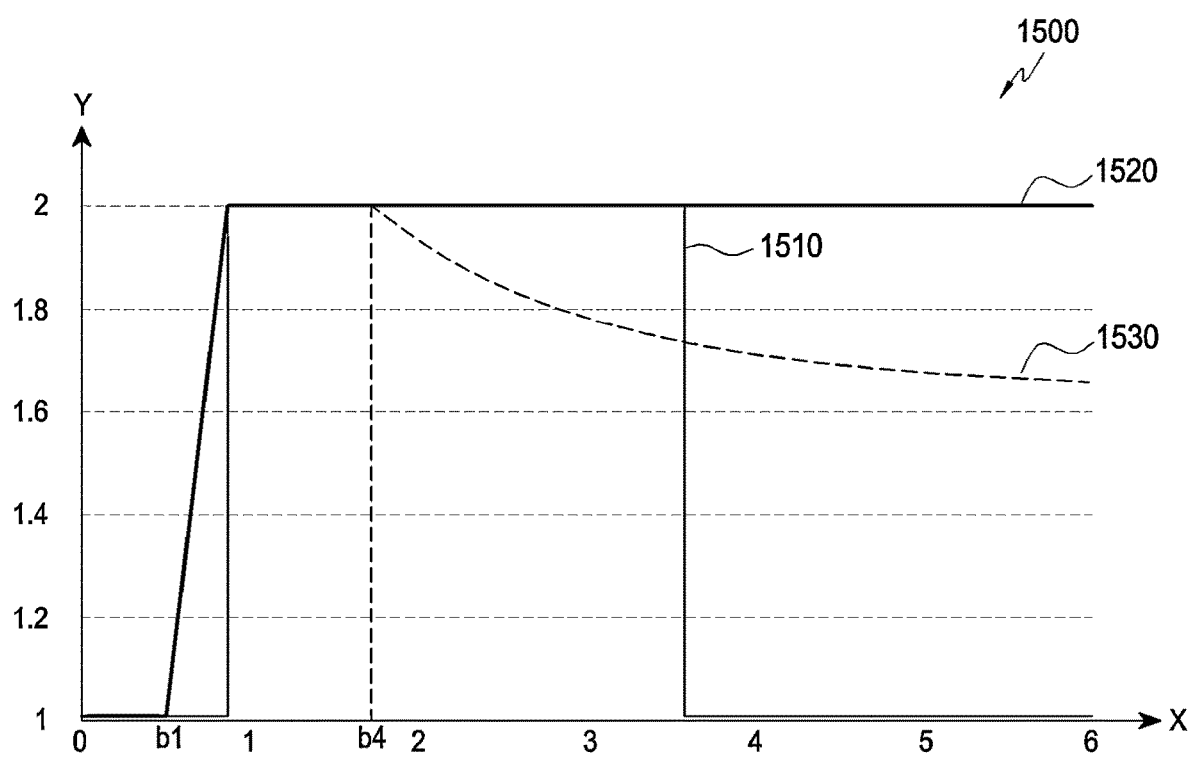
FIG. 15 is an exemplary diagram illustrating a scale factor determined when a display region changes in an electronic device including a slidable display according to various embodiments.

FIG. 15 is an exemplary diagram 1500 illustrating a scale factor determined when a display region changes in an electronic device 101 including a slidable display according to various embodiments.

Referring to FIGS. 13 to 15, in an embodiment, based on a region ratio determined as a display region of a slidable display is expanded (or reduced) in an electronic device 101 including a slidable display, the processor 230 may set a brightness range of the display module 210. For example, as shown by reference numeral 1301, 1302, and 1303, as the display region of the slidable display is expanded (or reduced) in the electronic device 101 including the slidable display, the processor 230 may set the brightness range of the display module 210, based on the region ratio.

In an embodiment, in reference numeral 1301, the processor 230 may display an HDR image through the display region of the display module 210. The processor 230 may determine a region ratio, based on the size of the first region 1311 in which the HDR image is displayed and the size of the second region 1312.

In an embodiment, in reference numeral 1302, as the display region of the display module 210 is expanded, the processor 230 may display the HDR image through the expanded display region. The processor 230 may determine a region ratio, based on the size of the first region 1321 in which the HDR image is displayed and the size of the second region. In reference numeral 1302, the horizontal length and the vertical length of the display region of the display module 210 may be the same. If the horizontal length and the vertical length of the display region of the display module 210 are the same, the size of the first region 1321 where the HDR image is displayed and the size of the second region may be the same, and the region ratio may be 1.

In an embodiment, in reference numeral 1303, as the display region of the display module 210 is expanded, the processor 230 may display the HDR image through the expanded display region. The processor 230 may determine a region ratio, based on the size of the first region 1331 where the HDR image is displayed and the size of the second region. In reference numeral 1303, the size of the first region and the size of the second region may be the same, and the region ratio may be 1.

In an embodiment, FIG. 14 may be a diagram illustrating comparison between the region ratio determined in a comparative example (e.g., the comparative example described with reference to 601 in FIG. 6) and the region ratio determined by the processor 230 in the case where display region of the display module 210 changes.

In an embodiment, Table 1 below may show the region ratio determined in the comparative example (hereinafter referred to as a "third region ratio") (e.g., the ratio of the size of the first region to the size of the display region of the display module 210) and the region ratio determined by the processor 230 (hereinafter referred to as a "fourth region ratio") (e.g., the ratio of the size of the first region to the second region) in the case where the display region of the display module 210 is expanded (e.g., in the case where the horizontal length of the display region of the display module 210 is increased and where the vertical length of the display region of the display module 210 is fixed).

TABLE 1

| Display region | | First region | | Third region ratio | Second region | | Fourth region ratio |
|---|---|---|---|---|---|---|---|
| Horizontal length | Vertical length | Horizontal length | Vertical length | | Horizontal length | Vertical length | |
| 1080 | 2400 | 1080 | 608 | 0.25 | 1080 | 1920 | 0.32 |
| 2160 | 2400 | 2160 | 1215 | 0.51 | 1350 | 2400 | 1.00 |
| 3240 | 2400 | 3240 | 1823 | 0.76 | 3240 | 1823 | 1.00 |
| 4320 | 2400 | 4267 | 2400 | 0.99 | 4267 | 2400 | 1.00 |
| 5400 | 2400 | 4267 | 2400 | 0.79 | 4267 | 2400 | 1.00 |
| 6480 | 2400 | 4267 | 2400 | 0.66 | 4267 | 2400 | 1.00 |
| 7560 | 2400 | 4267 | 2400 | 0.56 | 4267 | 2400 | 1.00 |
| 8640 | 2400 | 4267 | 2400 | 0.49 | 4267 | 2400 | 1.00 |

In Table 1, the display region may represent the display region of the display module 210, and the horizontal and vertical lengths of the display region may represent the numbers of horizontal and vertical pixels included in the display region, respectively. Although not shown in Table 1, Table 1 may correspond to the case in which the resolution of the HDR image is 1920*1080 (the horizontal value of the resolution of the HDR image is 1920 and the vertical value of the resolution of the HDR image is 1080).

As shown in Table 1, the third region ratio determined in the comparative example may be increased to 0.9 (about 1) and then reduced as the display region of the display module 210 is expanded. On the other hand, the fourth region ratio determined by the processor 230 may be maintained at 1 after increasing as the display region of the display module 210 is expanded.

In an embodiment, in the graph in FIG. 14, a first line 1410 may represent the fourth region ratio determined by the processor 230, and a second line 1420 may represent the third region ratio determined in the comparative example in the case where the display region of the display module 210 changes. In the graph in FIG. 14, the X-axis may represent the reciprocal of the aspect ratio of the display region (the ratio of the horizontal length of the display region of the display module 210 to the vertical length thereof) of the display module 210 (e.g., the display 1103 in the case where the electronic device is implemented such that the first structure 1101 slides in the horizontal direction on the second structure 1102), and the Y-axis may represent a region ratio.

In an embodiment, as shown in the first line 1410 in FIG. 14, as the size of the display region of the display module 210 increases (e.g., the ratio of the horizontal length of the display region of the display module 210 to the vertical length thereof increases), the fourth region ratio may remain at a certain value (e.g., b3), increase in a certain range (e.g., b1 to 1) of the reciprocal of the aspect ratio of the display region, and then remains at 1. In an embodiment, in the graph in FIG. 14, b1 may be the same value as the aspect ratio of the first region, and b3 may be a certain value obtained by squaring the aspect ratio of the first region.

In an embodiment, as shown in the second line 1420 in FIG. 14, as the size of the display region of the display module 210 increases (e.g., the ratio of the horizontal length of the display region of the display module 210 to the vertical length thereof increases), the third region ratio may be increased to 0.9 (about 1) and then reduced as the display region of the display module 210 is expanded. In an embodiment, in FIG. 14, b2 may be the same value as the reciprocal of the aspect ratio of the first region.

In an embodiment, in the graph in FIG. 15, a third line 1510 may represent a first scale factor determined by the processor 230, based on a region ratio (e.g., the fourth region ratio), and a fourth line 1520 may represent a second scale factor determined based on a region ratio (e.g., the third region ratio) determined in a comparative example (e.g., the comparative example described with reference to reference numeral 601 in FIG. 6) in the case where the display region of the display module 210 changes. In the graph in FIG. 15, the X-axis may represent the reciprocal of the aspect ratio of the display region (the ratio of the horizontal length of the display region of the display module 210 to the vertical length thereof) of the display module 210 (e.g., the display 1103 in the case where the electronic device is implemented such that the first structure 1101 slides in the horizontal direction on the second structure 1102), and the Y-axis may represent a scale factor.

In an embodiment, as shown in the fourth line 1520 in FIG. 15, as the size of the display region of the display module 210 increases, the second scale factor may remain at a certain value (e.g., 1), then increase to max of Equation 5 and remain, and then decrease to a certain value (e.g., 1) and remain. In the case where the brightness range of the display module 210 is set according to the second scale factor of the comparative example, since the second scale factor increases to max of Equation 5 and remain, and then decrease to a certain value (e.g., 1) and remain, the brightness of the display module 210 may not be increased if the size of the display region of the display module 210 (e.g., the horizontal length of the display module 210) is greater than or equal to a certain value (e.g., a certain horizontal length of the display module 210) in the case where an HDR image is displayed through the display region of the display module 210. In addition, since the second scale factor of the comparative example remains at a certain value (e.g., 1) and then abruptly increases to max of Equation 5, the brightness of the display module 210 may be rapidly increased.

In an embodiment, as shown in the third line 1510 in FIG. 15, as the size of the display region of the display module 210 increases, the first scale factor may remain at a certain value (e.g., 1), and then increase based on the function f(x) of Equation 5 in a certain range (e.g., b1 to 1) of the reciprocal of the aspect ratio of the display region and then remain at max of Equation 5 (e.g., when the scale factor is 2 in FIG. 15). As the first scale factor gradually increases as shown in the third line 1510 in FIG. 15, the brightness of the display module 210 may also gradually increase, and after the brightness of the display module 210 increases to max, even if the display region of the display module 210 is expanded, the brightness of the display module 210 may be maintained at max, so even if the size of the display region of the display module 210 (e.g., the horizontal length of the display module 210) is greater than or equal to a certain value (e.g., a certain horizontal length of the display module 210), the brightness of the display module 210 may be increased.

In an embodiment, in the case where an SDR image is displayed together with the HDR image through the display module 210 and where the scale factor is determined to be max (e.g., max of Equation 5), the processor 230, based on the on-pixel ratio, may reduce the brightness of the display module 210, based on the brightness of the display module 210 adjusted to the maximum (e.g., the brightness obtained by multiplying the scale factor max and the user-specified brightness). For example, if the SDR image displayed together with the HDR image is not a black image (e.g., if an SDR image other than a black image is displayed in a region other than the first region where the HDR image is to be displayed), the processor 230, based on the on-pixel ratio, may reduce the brightness of the display module 210, based on the brightness of the display module 210 adjusted to the maximum. For example, if the SDR image displayed together with the HDR image is not a black image, as shown in a fifth line 1530 illustrated in the range where the reciprocal of the aspect ratio of the display module 210 is b4 in FIG. 15, the processor 230, based on the on-pixel ratio, may gradually reduce the brightness of the display module 210 from the brightness of the display module 210 determined based on the scale factor of 2 as max (e.g., gradually reduce the brightness of the display). In an embodiment, the on-pixel ratio may be a ratio of white pixels to all pixels of the display module 210. In the case where a screen displayed on the display module 210 includes n pixels, the processor 230 may calculate average values of pixel values in each of the n pixels (e.g., when the screen is expressed as RGB data, averages of the R value, the G value, and the B value of each pixel) and determine the average of the calculated average values to be the on-pixel ratio. However, a method of determining the on-pixel ratio is not limited to the above-described example.

In an embodiment, when the SDR image displayed together with the HDR image is not a black image, the processor 230, based on the on-pixel ratio, may reduce the brightness of the display module 210, based on the brightness of the display module 210 adjusted to the maximum, thereby preventing the brightness in the region where the SDR image is displayed from excessively increasing from the user-specified brightness and reducing battery power consumption.

Figure 16:
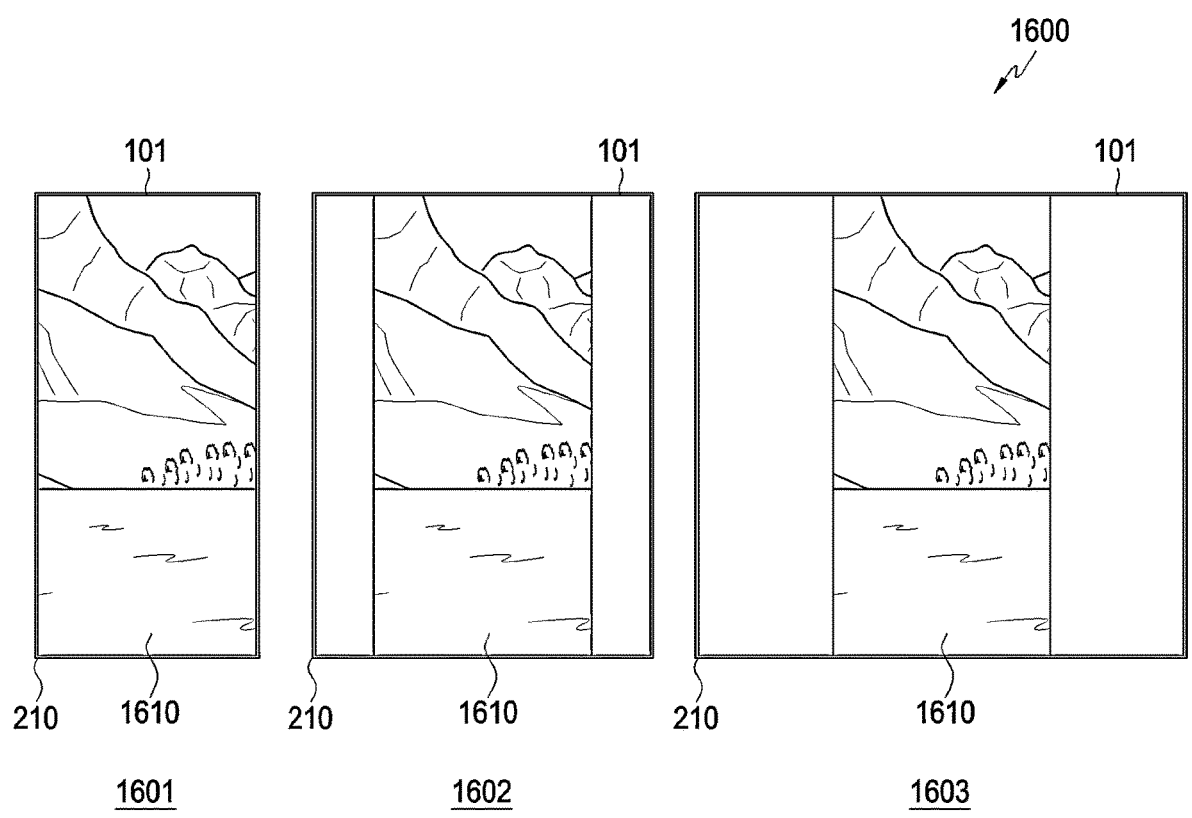
FIG. 16 is an exemplary diagram illustrating a method of providing an image in an electronic device including a slidable display according to various embodiments.

FIG. 16 is an exemplary diagram 1600 illustrating a method of providing an image in an electronic device 101 including a slidable display according to various embodiments.

Referring to FIG. 16, in an embodiment, based on a region ratio determined as the display region of a slidable display is expanded (or reduced) in an electronic device 101 including the slidable display, the processor 230 may set a brightness range. For example, as shown by reference numeral 1601, 1602, and 1603, as the display region of the slidable display is expanded in the electronic device 101 including the slidable display, the processor 230 may set a brightness range of the display module 210, based on the region ratio.

In an embodiment, reference numeral 1601 may denote the case in which the electronic device is in the state shown in FIG. 11A (the state in which the first structure 1101 is closed with respect to the second structure 1102), reference numeral 1603 may denote the case in which the electronic device is in the state shown in FIG. 11B (the state in which the first structure 1101 is opened with respect to the second structure 1102), and reference numeral 1602 may denote the case in which the electronic device is in an intermediate state between the state illustrated in FIG. 11A and the state illustrated in FIG. 11B.

In an embodiment, the processor 230, as indicated by reference numerals 1601, 1602, and 1603, the processor 230 may display an HDR image having an aspect ratio (or the aspect ratio of the first region), which is greater than or equal to the aspect ratio of the display module 210, through the display region of the display module 210. If the aspect ratio of the image (or the aspect ratio of the first region) is greater than or equal to the aspect ratio of the display module 210 (e.g., in common in reference numerals 1601, 1602, and 1603), the processor 230 may determine the region ratio to be 1 and determine the scale factor to be max of Equation 5. The processor 230 may determine the brightness of the display module 210 by multiplying the scale factor max by the user-specified brightness. In an embodiment, as denoted by reference numerals 1601, 1602, and 1603, the case where the aspect ratio of the image (or the aspect ratio of the first region) is greater than or equal to the aspect ratio of the display module 210 may be the case where the reciprocal of the aspect ratio of the display region of the display module 210 is greater than b2 (e.g., the reciprocal of the aspect ratio of the first region) in FIG. 14.

In an embodiment, although FIGS. 11a to 16 illustrate the method of providing an image in the electronic device 101 including a slidable display, the disclosure is not limited thereto. For example, the method of providing an image may be applied to all electronic devices including a display in which the display area thereof is variable (e.g., expanded or reduced) such as an electronic device 101 including a rollable display in which the display area is expanded or reduced as it is drawn out from or inserted into a housing.

In various embodiments of the disclosure, an electronic device 101 may include a display module 210 configured such that a region exposed to the outside is reduced as it is inserted into the electronic device 101 and such that a region exposed to the outside is expanded as it is drawn out of the electronic device 101, at least one sensor, and at least one processor (e.g., the processor 230) operatively connected to the display module 210 and the at least one sensor, wherein the at least one processor (e.g., the processor 230) may be set to obtain an HDR image, identify a region where the display module 210 is exposed to the outside, determine a size of a first region where the HDR image is to be displayed in the identified region, determine a size of a second region where the HDR image is able to be displayed in a maximum size while maintaining an aspect ratio of the HDR image in the identified region, and set a brightness range of the display module 210, based on the size of the first region and the size of the second region.

In various embodiments, the aspect ratio of the HDR image may be a ratio of a vertical value of resolution of the HDR image to a horizontal value of the resolution of the HDR image, and the second region may be a region having a maximum size among regions capable of displaying the HDR image while maintaining the aspect ratio of the HDR image in the region.

In various embodiments, the at least one processor (e.g., the processor 230) may be configured to determine a region ratio that is a ratio of the size of the first region to the size of the second region, determine a scale factor, based on the region ratio, and set the brightness range of the display module 210, based on the scale factor.

In various embodiments, if the electronic device 101 is implemented such that a ratio of a horizontal length to a vertical length of the region increases as the size of the region increases, as the size of the region increases, the region ratio may remain at a certain value, then increase in a certain range of the ratio, and remain at 1 after increasing in a certain range of the ratio.

In addition, the structure of data used in the above-described embodiment of this document may be recorded in a computer-readable recording medium through various means. The computer-readable recording medium includes a storage medium such as a magnetic storage medium (e.g., ROM, a floppy disk, a hard disk, etc.) and an optically readable medium (e.g., CD-ROM, DVD, etc.).

The invention claimed is:

1. An electronic device comprising:
  a display;
  at least one processor including processing circuitry, and
  memory storing instructions that, when executed by the at least one processor individually or collectively, cause the electronic device to:
    obtain an HDR image,
    determine a size of a first region in the display, the first region being a region where the HDR image is to be only displayed,
    determine a size of a second region in the display, the size of the second region corresponding to a maximum size at which the HDR image is capable of being displayed in the display while maintaining an aspect ratio of the HDR image, wherein the aspect ratio of the HDR image is a ratio of a vertical value of a resolution of the HDR image to a horizontal value of the resolution of the HDR image,
    set a brightness range of the display, based on the size of the first region and the size of the second region;
    display, using the set brightness range of the display, the HDR image in the first area through the display.

2. The electronic device of claim 1, wherein the second region is a region having a maximum size among regions capable of displaying the HDR image while maintaining the aspect ratio of the HDR image in the display.

3. The electronic device of claim 1, wherein the instructions, when executed by the at least one processor individually or collectively, cause the electronic device to:
  determine a region ratio that is a ratio of the size of the first region to the size of the second region,
  determine a scale factor, based on the region ratio, and
  set the brightness range of the display, based on the scale factor.

4. The electronic device of claim 3, wherein the scale factor increases as the region ratio increases in a specified section of the region ratio.

5. The electronic device of claim 4, wherein the instructions, when executed by the at least one processor individually or collectively, cause the electronic device to:
  based on the region ratio being less than a minimum value of the specified section, set the brightness range of the display, based on a first brightness of the display set by a user,
  based on the region ratio being greater than or equal to the minimum value of the specified section and less than a maximum value of the specified section, set the brightness range of the display based on the scale factor, which increases as the region ratio increases in the specified section, and the first brightness, and
  based on the region ratio being greater than or equal to the maximum value of the specified section, set the brightness range of the display, based on the scale factor determined as a ratio of a maximum brightness of the display set to display the HDR image to a maximum brightness of the display capable of being set by the user and the first brightness.

6. The electronic device of claim 3, wherein the instructions, when executed by the at least one processor individually or collectively, cause the electronic device to:
  based on the HDR image including a plurality of HDR images, determine sizes of a plurality of first regions where the plurality of HDR images are to be displayed in the display,
  determine sizes of a plurality of second regions where the HDR image is able to be displayed in the maximum size while maintaining the aspect ratio of the HDR image in the display,
  determine a plurality of region ratios, based on the sizes of the plurality of first regions and the sizes of the plurality of second regions, and
  determine the region ratio, based on the plurality of region ratios and a plurality of weights assigned to respective ones of the plurality of region ratios.

7. The electronic device of claim 1, wherein the instructions, when executed by the at least one processor individually or collectively, cause the electronic device to:
  based on a plurality of HDR images included in the HDR image being respectively displayed in a plurality of windows produced by a multi-window function, determine sizes of a plurality of first regions where the plurality of HDR images is to be displayed in the plurality of windows,
  determine sizes of a plurality of second regions where the HDR image is able to be displayed in the maximum size while maintaining the aspect ratio of the HDR image in the plurality of windows, and
  set the brightness range of the display, based on the sizes of the plurality of first regions and the sizes of the plurality of second regions.

8. The electronic device of claim 1, wherein the instructions, when executed by the at least one processor individually or collectively, cause the electronic device to:
  based on one or more HDR images included in the HDR image being produced by a pop-up window function and respectively displayed in one or more windows that at least partially overlap each other, identify a window disposed at a top of the display among the one or more windows, and
  determine an HDR image displayed in the window as the HDR image for determining the first region and the second region.

9. A method of providing an image in an electronic device, the method comprising:
  obtaining an HDR image;
  determining a size of a first region in a display of the electronic device, the first region being a region where the HDR image is displayed;
  determining a size of a second region in the display, the second region being a region corresponding to a maximum size at which the HDR image is capable of being displayed in the display while maintaining an aspect ratio of the HDR image, wherein the aspect ratio of the HDR image is a ratio of a vertical value of a resolution of the HDR image to a horizontal value of the resolution of the HDR image;
  setting a brightness range of the display, based on the size of the first region and the size of the second region; and
  displaying, using the set brightness display, the HDR image in the first area through the display.

10. The method of claim 9, wherein the second region is a region having a maximum size among regions capable of displaying the HDR image while maintaining the aspect ratio of the HDR image in the display.

11. The method of claim 9, wherein the setting of the brightness range of the display comprises:
   determining a region ratio that is a ratio of the size of the first region to the size of the second region;
   determining a scale factor, based on the region ratio; and
   setting the brightness range of the display, based on the scale factor.

12. The method of claim 11, wherein the scale factor increases as the region ratio increases in a specified section of the region ratio.

13. The method of claim 12, wherein the setting of the brightness range of the display, based on the scale factor, comprises:
   based on the region ratio being less than a minimum value of the specified section, setting the brightness range of the display, based on a first brightness of the display set by a user;
   based on the region ratio being greater than or equal to the minimum value of the specified section and less than a maximum value of the specified section, setting the brightness range of the display, based on the scale factor, which increases as the region ratio increases in the specified section, and the first brightness; and
   based on the region ratio being greater than or equal to the maximum value of the specified section, setting the brightness range of the display, based on the scale factor determined as a ratio of a maximum brightness of the display set to display the HDR image to a maximum brightness of the display capable of being set by the user and the first brightness.

14. The method of claim 11, wherein the determining of the region ratio comprises:
   based on the HDR image including a plurality of HDR images:
   determining sizes of a plurality of first regions where the plurality of HDR images is to be displayed in the display;
   determining sizes of a plurality of second regions where the HDR image is able to be displayed in the maximum size while maintaining the aspect ratio of the HDR image in the display;
   determining a plurality of region ratios, based on the sizes of the plurality of first regions and the sizes of the plurality of second regions; and
   determining the region ratio, based on the plurality of region ratios and a plurality of weights assigned to the respective region ratios.

15. The method of claim 9, further comprising:
   based on a plurality of HDR images included in the HDR image being respectively displayed in a plurality of windows produced by a multi-window function:
   determining sizes of a plurality of first regions where the plurality of HDR images is to be displayed in the plurality of windows;
   determining sizes of a plurality of second regions where the HDR image is able to be displayed in the maximum size while maintaining the aspect ratio of the HDR image in the plurality of windows; and
   setting the brightness range of the display, based on the sizes of the plurality of first regions and the sizes of the plurality of second regions.

16. The method of claim 9, further comprising:
   based on one or more HDR images included in the HDR image being produced by a pop-up window function and respectively displayed in one or more windows that at least partially overlap each other:
   identifying a window disposed at a top of the display among the one or more windows; and
   determining an HDR image displayed in the window as the HDR image for determining the first region and the second region.

17. An electronic device comprising:
   a display having a region exposed to an outside, the region being reduced as it is inserted into the electronic device and expanded as it is drawn out of the electronic device;
   at least one sensor;
   at least one processor including processing circuitry; and
   memory storing instructions that, when executed by the at least one processor individually or collectively, cause the electronic device to:
   obtain an HDR image,
   identify a region where the display is exposed to the outside,
   determine a size of a first region in the identified region where the HDR image is to be only displayed,
   determine a size of a second region in the identified region, the size of the second region corresponding to a maximum size at which the HDR image is capable of being displayed in the identified region while maintaining an aspect ratio of the HDR image, wherein the aspect ratio of the HDR image is a ratio of a vertical value of a resolution of the HDR image to a horizontal value of the resolution of the HDR image,
   set a brightness range of the display, based on the size of the first region and the size of the second region, and
   display, using the se tightness range of the display, the HDR image in the first area through the display.

18. The electronic device of claim 17, wherein the second region is a region having a maximum size among regions capable of displaying the HDR image while maintaining the aspect ratio of the HDR image in the region.

19. The electronic device of claim 17, wherein the instructions, when executed by the at least one processor individually or collectively, cause the electronic device to:
   determine a region ratio that is a ratio of the size of the first region to the size of the second region,
   determine a scale factor, based on the region ratio, and
   set the brightness range of the display, based on the scale factor.

20. The electronic device of claim 19, wherein a ratio of a horizontal length to a vertical length of the region increases as the size of the region increases, as the size of the region increases, the region ratio remains at a certain value, then increases in a certain range of the ratio, and remains at 1 after increasing in a certain range of the ratio.

* * * * *